US005797445A

United States Patent [19]
Westbrooks, Jr. et al.

[11] Patent Number: 5,797,445
[45] Date of Patent: Aug. 25, 1998

[54] REFRIGERATED RETHERMALIZATION CART

[75] Inventors: John Walter Westbrooks, Jr., Christiana; Sara Coffield Hurt, Nashville, both of Tenn.

[73] Assignee: Standex International Corporation, Salem, N.H.

[21] Appl. No.: 470,629

[22] Filed: Jun. 6, 1995

Related U.S. Application Data

[63] Continuation-in-part of Ser. No. 251,840, May 31, 1994, Pat. No. 5,454,427, and Ser. No. 310,710, Sep. 21, 1994, which is a continuation-in-part of Ser. No. 980,376, Nov. 23, 1992, abandoned, said Ser. No. 251,840, is a division of Ser. No. 980,376.

[51] Int. Cl.$^6$ .................................................. F25B 29/00
[52] U.S. Cl. ...................... 165/11.1; 165/206; 165/48.1; 165/64; 165/918; 165/919; 99/331; 99/332; 99/333; 219/478; 219/480; 219/386; 219/387; 219/487; 312/236
[58] Field of Search .................... 165/918, 919, 165/48.1, 64, 11.1, 206; 219/478, 480, 386, 387, 487; 99/331, 332, 333; 312/236

[56] References Cited

U.S. PATENT DOCUMENTS

| | | | |
|---|---|---|---|
| 3,199,579 | 8/1965 | Foster et al. | 165/48 |
| 3,205,033 | 9/1965 | Stentz | 312/236 |
| 3,255,812 | 6/1966 | Bayane et al. | 165/27 |
| 3,275,393 | 9/1966 | Stentz et al. | 312/214 |
| 3,311,434 | 3/1967 | Dyer et al. | 312/214 |
| 3,353,476 | 11/1967 | Godman et al. | 165/12 |
| 3,608,627 | 9/1971 | Shevlin | 165/2 |
| 3,682,643 | 8/1972 | Foster | 165/918 |
| 3,842,724 | 10/1974 | Kor et al. | 99/358 |
| 3,924,100 | 12/1975 | Mack et al. | 219/386 |
| 3,965,969 | 6/1976 | Williamson | 165/12 |
| 4,005,745 | 2/1977 | Colato et al. | 165/2 |
| 4,019,022 | 4/1977 | Seider | 219/386 |
| 4,068,115 | 1/1978 | Mack et al. | 219/386 |
| 4,087,142 | 5/1978 | Aumack | 312/236 |
| 4,093,041 | 6/1978 | Davis et al. | 186/1 |
| 4,103,736 | 8/1978 | Colato et al. | 165/48 |

(List continued on next page.)

FOREIGN PATENT DOCUMENTS

WO91/02481    3/1991    WIPO.

*Primary Examiner*—John K. Ford
*Attorney, Agent, or Firm*—Luedeka, Neely & Graham, P.C.

[57] ABSTRACT

An integrated refrigeration and rethermalization system for storage of prepared meals in a refrigerated state, rethermalization of the meals in accordance with a rethermalization program, and maintenance of the rethermalized meals at a desired serving temperature is disclosed. Refrigerated meals are placed on trays, supported by heater shelves, in a refrigeration-rethermalization cart having onboard refrigeration. Critical cooling elements of the onboard refrigerator are located within the food storage area of the cart for improved cooling air flow and maximum cooling efficiency. The heater shelves contain one or more heating elements designed to heat only selected food items located on the trays in accordance with preset time-temperature curves, or rethermalization programs. A user control panel is located on the outside of the cart and enables a user to select from onboard electronic memory one or more rethermalization programs for use by an onboard integrated control system, or the user may construct a rethermalization program by entering the appropriate parameters. Rethermalization programs provide the instructions necessary to enable the integrated control system to rethermalize selected food items located on the trays. The program tells the integrated control system when rethermalization should be initiated (by turning on the heaters located in the heater shelves), the desired temperature that should be reached during rethermalization, and when rethermalization should be completed. Since the integrated control system, user interface, rethermalization heaters, and refrigerator are all located onboard the cart, the system can be programmed at the kitchen where the food is loaded into the cart, or it can be programmed at a remote location after the cart has been loaded.

4 Claims, 24 Drawing Sheets

U.S. PATENT DOCUMENTS

| | | | |
|---|---|---|---|
| 4,194,109 | 3/1980 | Springer | 219/386 |
| 4,203,486 | 5/1980 | Rubbright et al. | 165/48 |
| 4,232,789 | 11/1980 | Springer | 206/562 |
| 4,235,282 | 11/1980 | de Filippis et al. | 165/61 |
| 4,254,824 | 3/1981 | Springer | 165/64 |
| 4,285,391 | 8/1981 | Bourner | 165/30 |
| 4,316,078 | 2/1982 | Mack et al. | 219/386 |
| 4,323,110 | 4/1982 | Rubbright et al. | 165/2 |
| 4,384,191 | 5/1983 | Guibert | 219/400 |
| 4,517,446 | 5/1985 | Torning | 219/386 |
| 4,751,368 | 6/1988 | Daifotes | 219/432 |
| 4,881,590 | 11/1989 | Meier | 165/48.1 |
| 4,884,626 | 12/1989 | Filipowski | 165/12 |
| 4,990,749 | 2/1991 | Devine et al. | 219/385 |
| 5,093,556 | 3/1992 | Oelfke | 219/386 |
| 5,243,171 | 9/1993 | Wood et al. | 219/386 |
| 5,285,051 | 2/1994 | DeGrow et al. | 165/919 |
| 5,454,427 | 10/1995 | Westbrooks et al. | 165/919 |

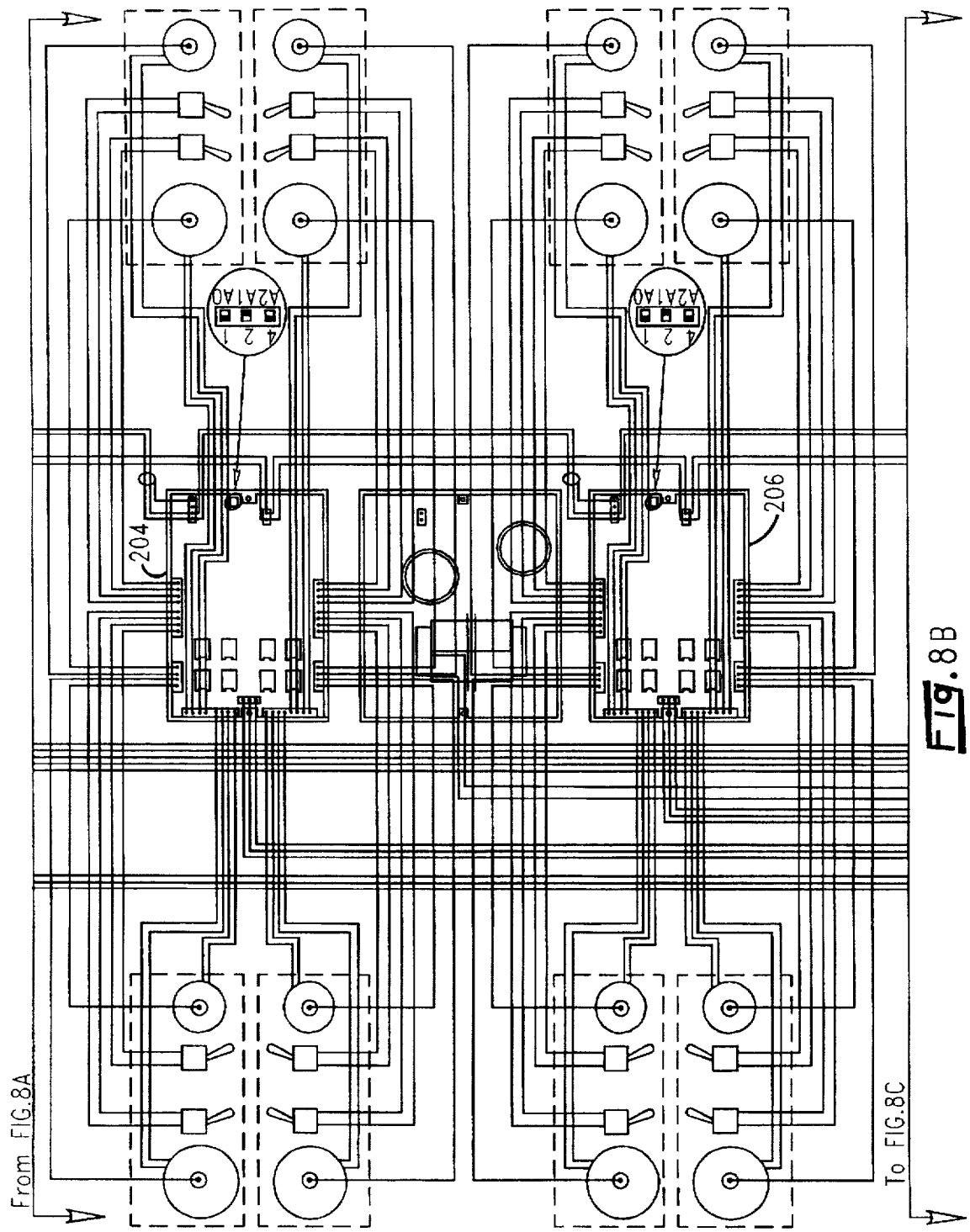

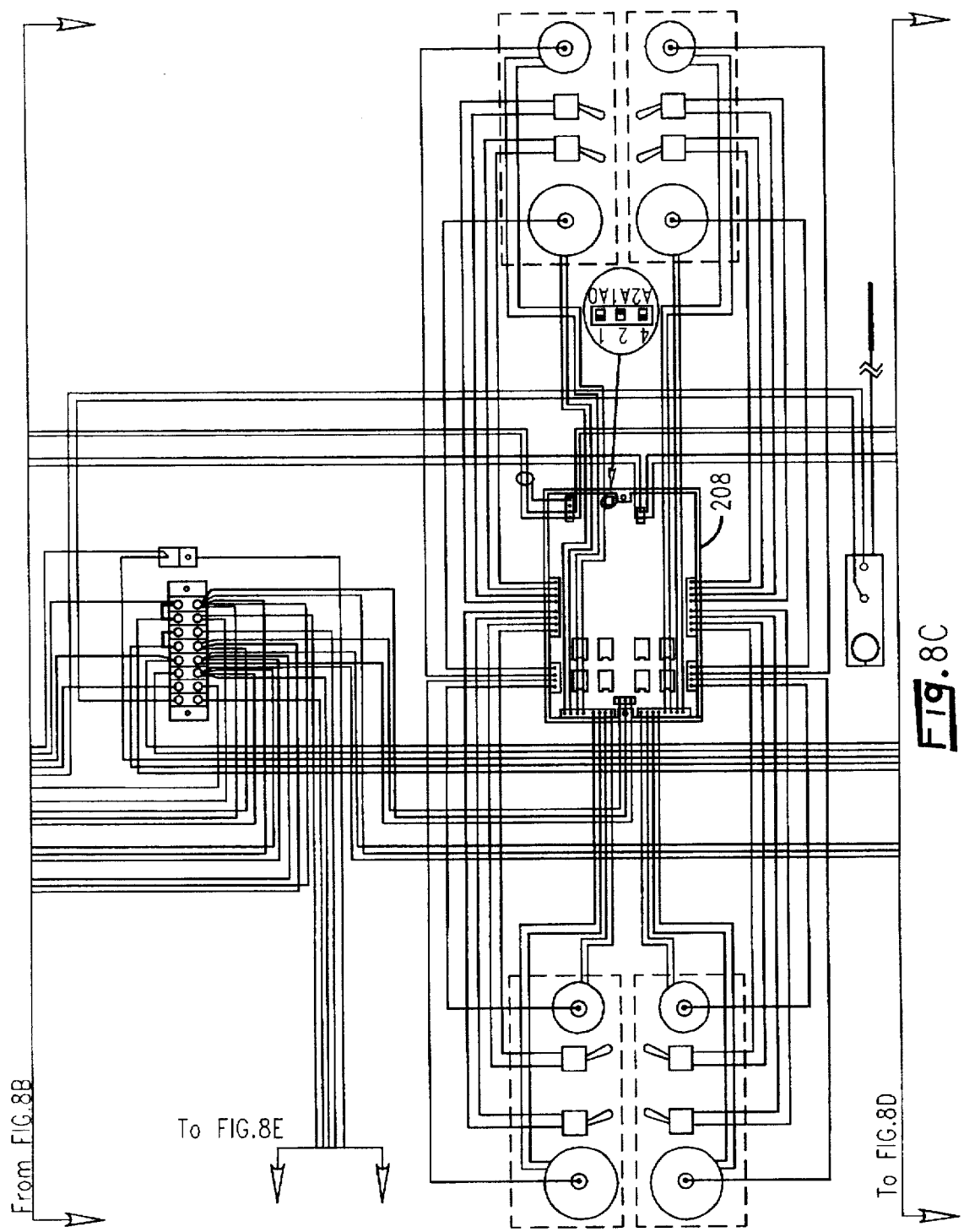

5,797,445

REFRIGERATED RETHERMALIZATION CART

TECHNICAL FIELD

This application is a continuation in part of two applications: Ser. No. 08/251,840 filed May 31, 1994 now Pat. No. 5,454,427, which is a divisional application of Ser. No. 07/980,376, filed Nov. 23, 1992 abandoned; and Ser. No. 08/310,710 filed Sep. 21, 1994, which is a continuation in part of Ser. No. 07/980,376, filed Nov. 23, 1992 abandoned.

This invention relates to the field of refrigerated storage and rethermalization of food and particularly to an integrated storage and rethermalization system for providing an easy, efficient and reliable means for serving a large number of meals at a desired time.

BACKGROUND OF THE INVENTION

The preparation and serving of large numbers of meals in an institutional setting has long posed a variety of problems. The ability to serve palatable meals with the various dishes being served at optimum temperature often conflicts with efforts to make service of the meals easier, more efficient and less manpower intensive.

The preparation, storage, rethermalization and service of a large number of meals has evolved through several stages. Initially, trays would be filled with foods from various hot or cold storage container areas just prior to serving and transported to the individual serving areas (such as patient's rooms in a hospital). However, as facilities grew larger, the assembly of trays from a centralized area became very difficult if not impossible. Frequently, in such systems the time between tray assembly and service grew larger, resulting in food being served at an unpalatable temperature or with spoilage occurring.

Early attempts to overcome such problems resulted in the development of storage carts having separate hot and cold storage compartments. These separate compartments would either be heated or cooled or would be well insulated in order to maintain the food at a desired temperature. In use, food would be loaded into separate hot and cold storage compartments at a central food preparation area. The carts could then be transferred to various assembly locations. The individual meals could then be assembled on trays as desired and served. However, while such delivery systems did improve the time lag between assembly of the trays and service of the meal, they still required significant manpower at serving time because these trays had to be assembled. As a result, frequently the hot food would be maintained hot for an extended period of time and become unpalatable or, if all trays were assembled at once, some food would be cold by the time it was served. Additionally, meal service times would be extended over the time required to assemble the trays.

Another development was a food service system of trays and carts incorporating heating elements for rethermalization of refrigerated foods. The foods were located on trays and kept in a refrigerated environment until the rethermalization cycle was initiated. In this type of system, trays could be pre-assembled whenever desired and loaded into the carts. In the refrigerated environment food would remain cold. At a desired time, heating elements would be activated, perhaps through computer programming, to rethermalize the food and to maintain the warm food in a warm condition while not effecting the food in the other chilled compartments which is to remain chilled. After the food had reached a serving temperature the carts could then be rolled to the service locations and the trays served.

One approach to providing a refrigerated environment for the cart was to enclose the cart within a physically separate refrigerator so that the refrigeration system was physically separate from the rethermalization system. The electronic controls for controlling the rethermalization process were either located on the refrigerator or the cart, or both. Approaches that incorporate controls on the refrigerator require that the desired rethermalization start times be programmed only when the cart is physically docked, or otherwise connected to the refrigerator. In addition, electrical power for rethermalization heating elements located on the cart was provided by the refrigerator so that at the initiation of the rethermalization start time, the refrigerator would provide power to the cart for the rethermalization process. This approach required that a plug or other electrical interface with many pins be connected between the cart and refrigerator to provide electrical current to the heater elements, as well as for the control of any control devices located on the cart, making for a highly unreliable design. The alternative of providing all of the controls on the cart itself required that the refrigerator would have to be opened every time the controls were accessed and each cart was programmed at least partially independently of the control system on the refrigerator.

In one previous approach where the refrigerator and rethermalization cart were physically separate, the refrigerator controls and power supply were located on the refrigerator, while rethermalization program controls for controlling the temperature and cooking time of the heater elements were located on the cart. A dietician in the control kitchen (i.e., where the food is prepared and loaded onto the cart) could not determine when the food would start cooking on the cart because rethermalization start times were input at the refrigerator and the refrigerator was distant. Additionally, a dietician at the refrigerator could not change the cooking temperature/time curves (rethermalization programs) when the cart was in the control kitchen because that function was controlled by the cart. To change these programs after the cart had been mated with the refrigerator, the refrigerator would have to be opened so that the technician could gain access to the controls on the cart.

Furthermore, a refrigerator that is separate from the cart also suffers from inefficiency by requiring the refrigeration of a volume of space larger than the volume defined by the cart itself. This is so in part because the cooling elements of the refrigerator are located an inefficient distance from the food that needs to be refrigerated.

SUMMARY OF THE INVENTION

The above discussed problems are overcome in an integrated refrigeration and rethermalization system made in accordance with a preferred embodiment of the present invention. In a preferred embodiment, there is provided an integrated refrigeration and rethermalization system for rethermalizing foods, for maintaining the foods in a refrigerated state until they are rethermalized, and heating certain foods to a desired temperature at a serving time while maintaining certain other foods in a chilled condition. In this embodiment, the refrigeration and rethermalization system comprises a plurality of trays for supporting food items thereon which include the food items to be rethermalized. A refrigeration-rethermalization cart having at least one outer surface and at least one inner compartment is provided, where the trays of food are located in the inner compartment. A plurality of heater shelves, including individual heating elements, are disposed in the inner compartment under the trays for supporting the trays and selectively rethermalizing the desired foods located on the trays. After being loaded with trays of food, the refrigeration-rethermalization cart is refrigerated by an onboard refrigerator having a plurality of cooling elements disposed in the cart for keeping foods on the trays in a refrigerated state until they are rethermalized. A power supply supplies electrical power to the heaters and the refrigerator. An integrated control system is continuously connected to the refrigerator and the heaters for controlling the refrigeration and rethermalization of foods on the trays by controlling the power being supplied to the heaters and to the refrigerator.

In one embodiment of the present invention, one or more of the refrigerator cooling elements are disposed in the inner compartment of the cart.

In another embodiment, refrigeration and rethermalization of foods on the trays is accomplished in accordance with rethermalization program selector means having a plurality of rethermalization programs. In this embodiment, a user may select the desired rethermalization program to be utilized from the plurality of rethermalization programs. Further, a heat sensor is located at each of the heaters for sensing the temperatures of the heaters, generating a signal corresponding to the temperatures sensed, and providing the signal to the integrated control system.

In a further embodiment of the present invention, the integrated control system may have a first microcontroller located on the cart with the first microcontroller containing an onboard clock and being programmable with a plurality of meal serving times for generating a start signal at a predetermined time interval before each programmed meal serving time. In addition, the integrated control system may have a plurality of heater microcontrollers located on the cart and connected between the supply of power and the heaters such that each of the heater microcontrollers is adapted to control the heaters located on at least one of the heater shelves, and to be responsive to the start signal of the first microcontroller in accordance with at least one rethermalization program. In this embodiment, the rethermalization programs are stored in memory means.

BRIEF DESCRIPTION OF THE DRAWINGS

These and further features of the invention will be best understood by reference to the following detailed description of a preferred embodiment when considered in conjunction with the Figures in which:

FIGS. 8A-E combine to form a wiring diagram of the refrigeration and rethermalization system;

DETAILED DESCRIPTION OF A PREFERRED EMBODIMENT

Figure 4:
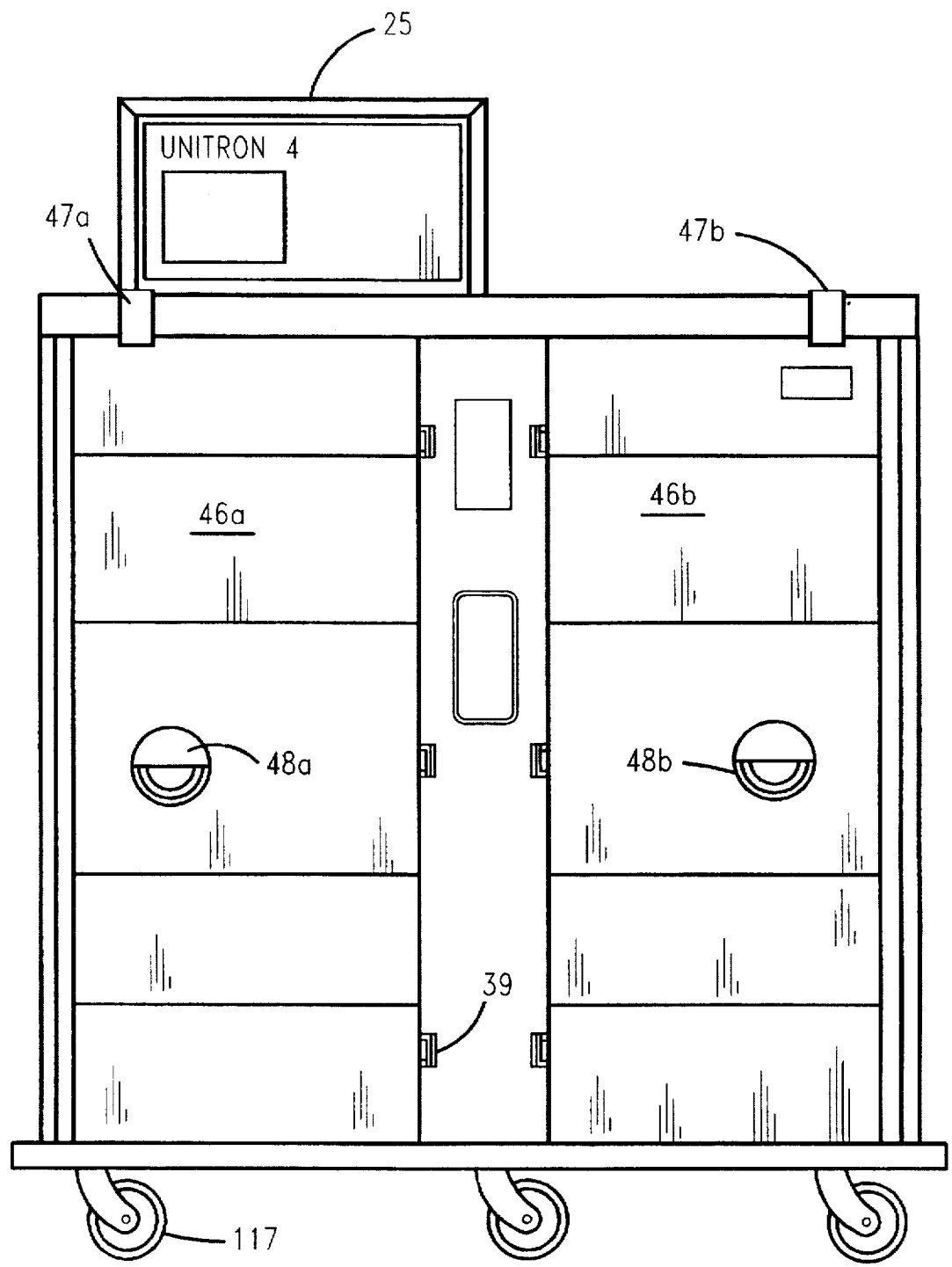
FIG. 4 is a front view showing an alternate location of the compressor housing unit.
Figure 7:
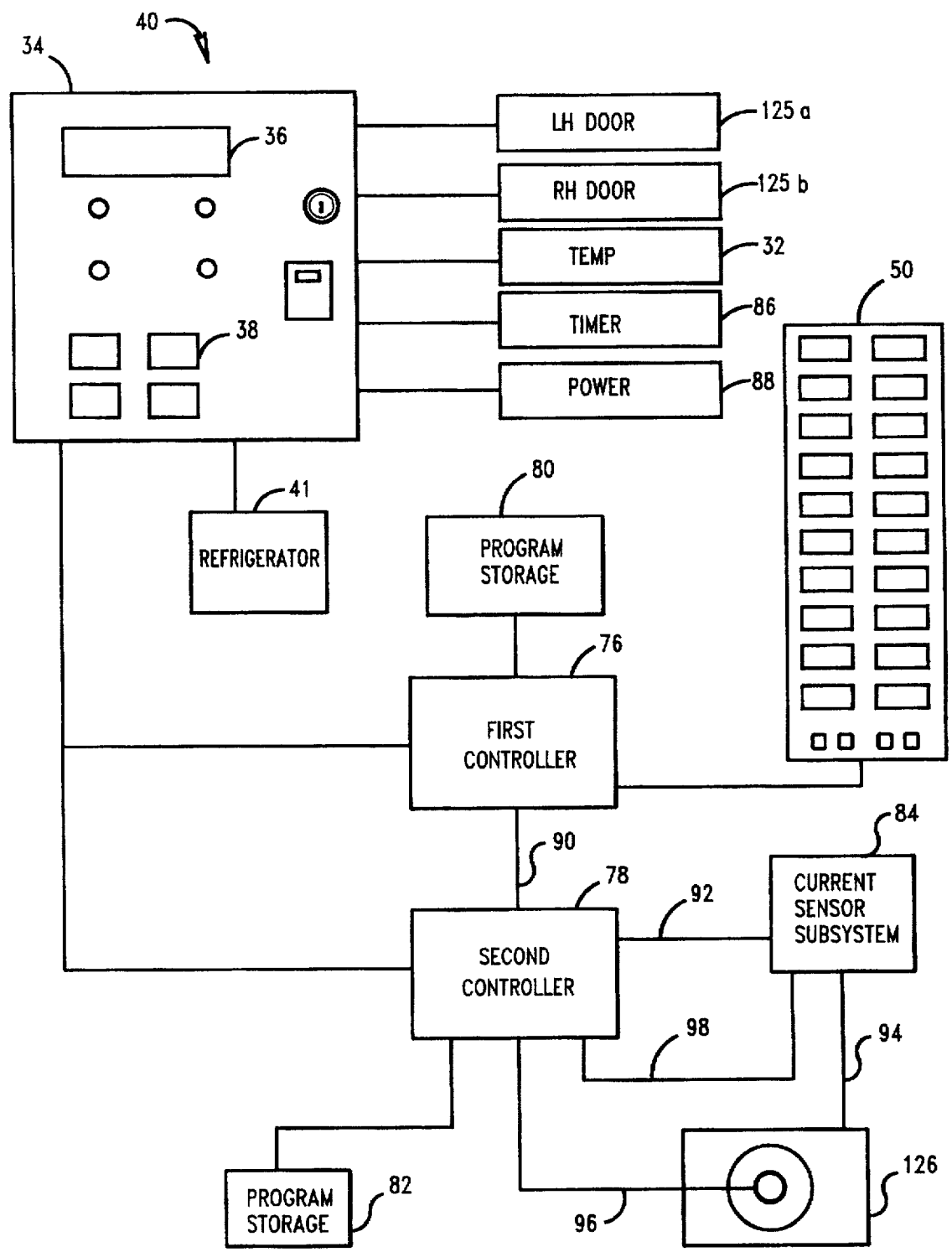
FIG. 7 is a block diagram showing the control features of the integrated refrigeration and rethermalization system.
Figure 8A:
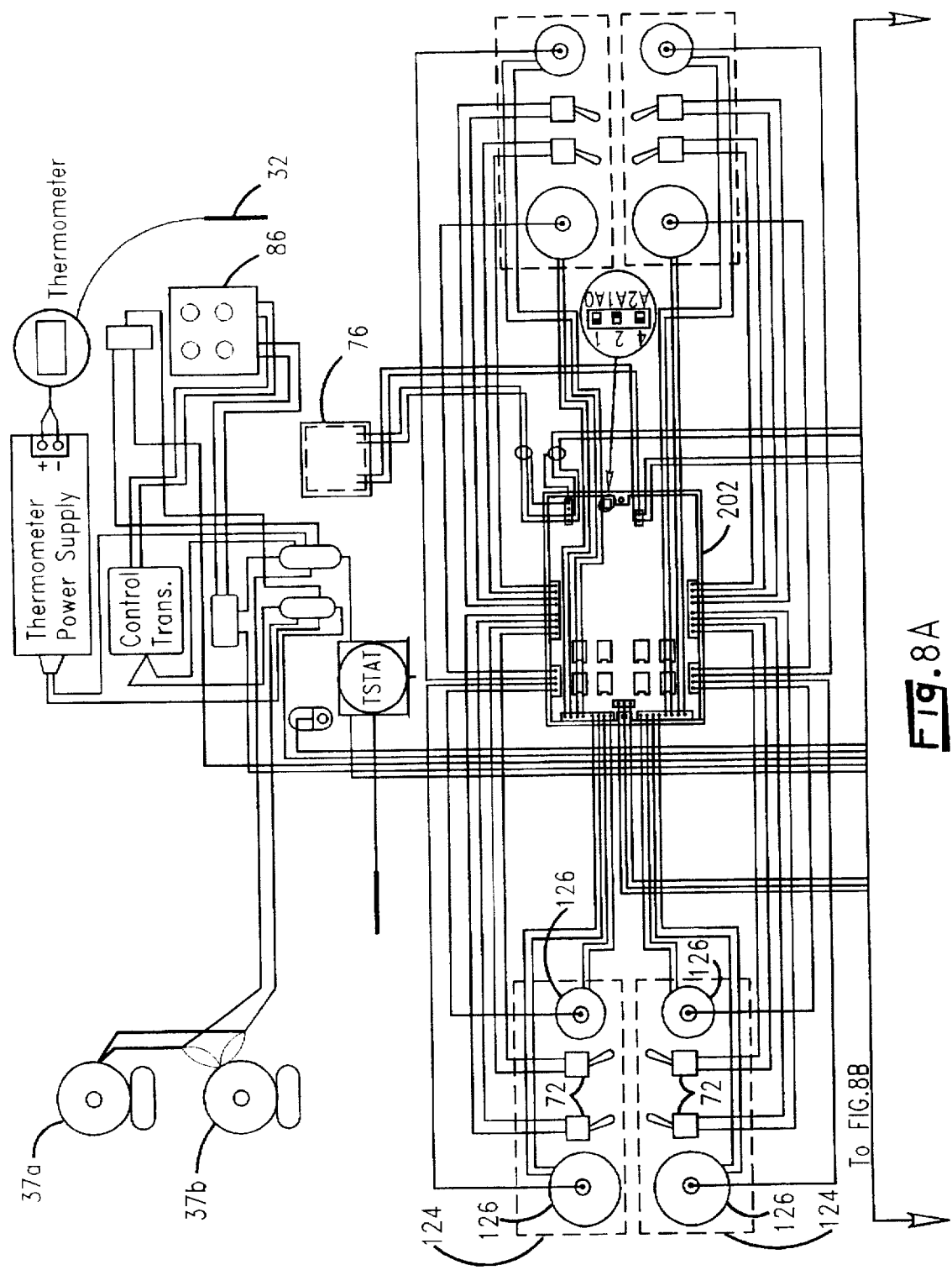
Figure 8D:
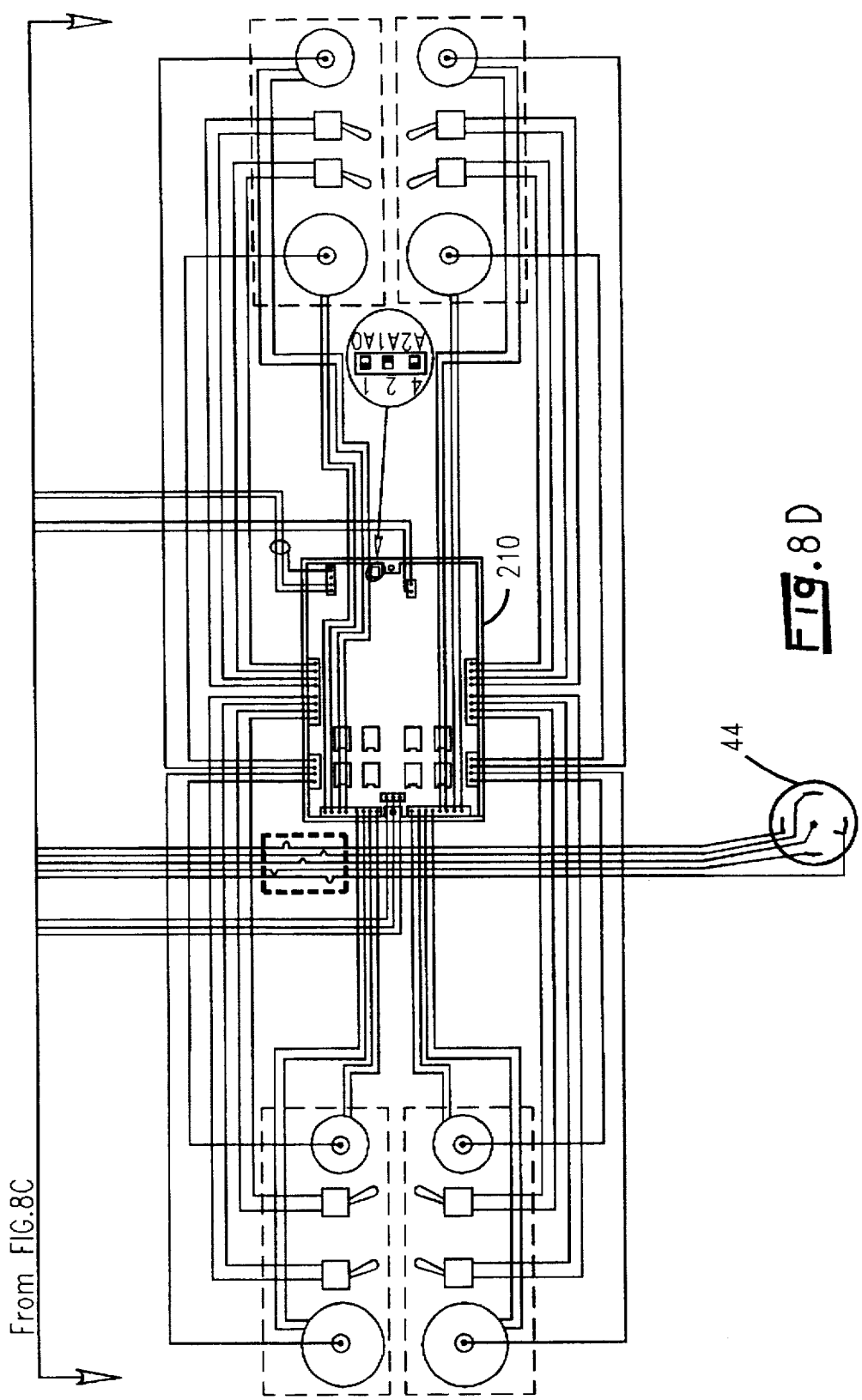
Figure 8E:
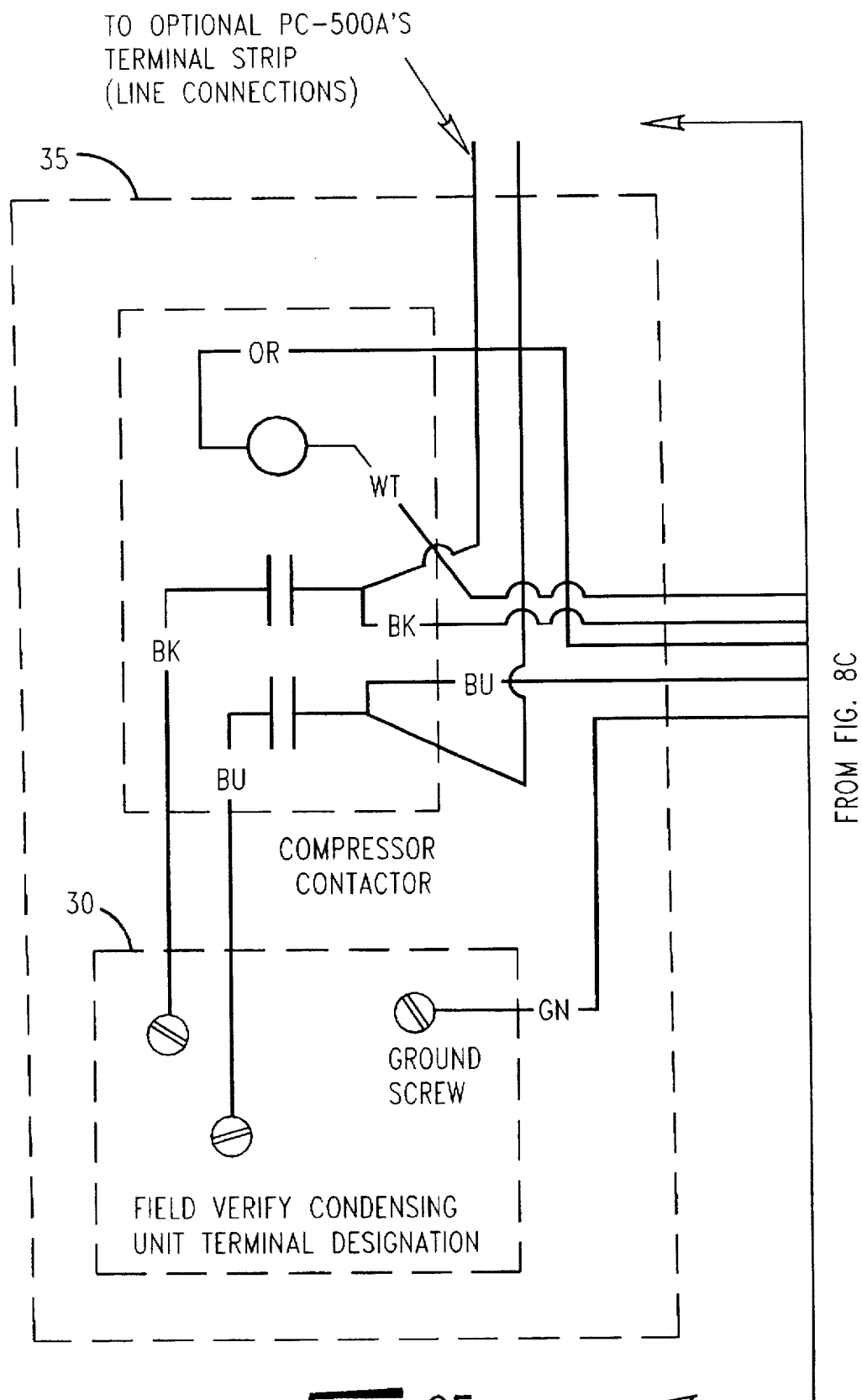

With reference now to FIGS. 1, 2, 3 and 7, there is shown a preferred embodiment of the integrated refrigeration and rethermalization system of the present invention utilizing an onboard refrigerator 41 (FIG. 7). A refrigeration-rethermalization cart 22 comprises a compressor housing unit 35 and an inner compartment, or food storage area 24. The food storage area 24 is an insulated, single compartment, storage area with two access doors 46a and 46b (FIG. 4) located on the front of the cart. Each door is provided with a flush mounted door handle 127 and three heavy-duty pin hinges 39. Lockable transport latches 47a and 47b enable the doors 46a and 46b to be secured during transport. A compressor 30 located within the housing unit 35 receives power from a 208 V/AC source 88 (FIG. 7) via power cable 44. An optional battery 31 is located within the housing unit 35 and provides power for a motorized embodiment of the cart 22. In the motorized embodiment, the battery 31 provides power to a dc drive motor for propelling the cart in a forward or reverse direction, thereby enhancing the cart's maneuverability. Alternatively, the housing unit 35 may be located on top of the cart 22 as shown in FIG. 4.

In a preferred embodiment, the compressor 30 is a ¾ horsepower, hermetically sealed compressor/condensing unit. The compressor 30 is coupled to an evaporator coil 33 with dual blowers 37a and 37b for circulating refrigerated air within the food storage area 24; the compressor 30, evaporator coil 33, and dual blowers 37a and 37b comprising the refrigerator 41 (FIG. 7).

The structural design of the cart 22, as well as the onboard integrated control system 40 (FIG. 7), incorporate common features of the rethermalization cart and control system disclosed in patent application Ser. No. 08/310,710 filed Sep. 21, 1994, which disclosure is incorporated herein by reference. Generally, the rethermalization cart 22 is made of #22 gage stainless steel with foam insulation, but it will be understood that other construction materials may be used instead. The cart 22 rests on wheels or casters 117 to facilitate movement of the cart 22. Tray supports 120 are provided to properly position and hold a number of food service trays 122 within the food storage area 24. Positioned below each tray support 120 is a heater shelf 124 which contains the heaters 126 used to rethermalize the food items on a tray 122. The heater shelves 124, which provide support for the trays 122, are geometrically positioned and spaced into vertical columns 49 and 51, defining a volume 53 of space between the columns. This volume provides a preferred location for critical cooling elements of the refrigerator 41. Critical cooling elements include the evaporator coil 33 and dual blowers 37a and 37b, and are considered critical because cooling efficiency is enhanced by placing them in the center of the food storage area 24 in close proximity to the food items on the trays 122. On each heater shelf 124 are two toggle switches 72 for controlling power to the heaters 126. Also located on each cart 22 are a number of heater controller boards 202–210 (FIGS. 8A–E), a power supply (not shown) and heater controllers (not shown) which will be more fully described herein with reference to FIGS. 7–20.

In a preferred embodiment, the cart 22 incorporates a variety of different monitoring features. For example, switches 125a and 125b are used to provide an indication of whether the doors 127a and 127b of the cart 22 are open. Additionally, a temperature sensing device 32 is located within the food storage area 24 to generate a temperature signal.

Controls for the refrigerator 41 and heaters 126 are similar to those disclosed in patent application Ser. No. 08/310,710 filed Sep. 21, 1994, which disclosure is incorporated herein by reference, except that the present invention combines these controls into a single integrated control system. In the present system, user inputs are entered via a refrigerator control panel 34 (FIGS. 1 and 7) which is conveniently located on the front of cart 22 in the area separating the two columns of heater shelves. As shown in FIG. 7, this control panel 34 is used to control operation of the refrigerator 41, as well as to monitor the various sensing devices on the cart 22, such as the door open switches 125a and 125b and the temperature sensor 32 in the food storage area 24, and provide appropriate operator feedback on the display 36. For example, the refrigerator control panel 34 monitors the signals from these devices and analyzes the signals according to programmed instructions. These instructions include provisions for sounding an alarm when the temperature signal from the temperature sensor 32 indicates that the temperature within the food storage area 24 exceeds a preset limit. Also, the refrigerator control panel 34 sounds an alarm when either of the door switches 125a and 125b indicates that a door has been open longer than a preset time. These conditions are programmed into the refrigerator control panel 34 by use of the keyboard 38.

In addition to providing various monitoring functions, the refrigerator control panel 34 also controls initiation of the rethermalization process. Generally, the system 20 functions to keep food items stored within the food storage area 24 safely refrigerated until they are to be served. The system 20 operates to begin a rethermalization cycle at a predetermined time interval before the desired serving time. The exact start of the rethermalization cycle will depend upon the length of the cycle and the desired serving time. The refrigerator control panel 34 initiates the rethermalization cycle by providing power to the heaters 126 located beneath selected food items on the trays 122 at a predetermined time, that time having been programmed into the refrigerator control panel 34 by an operator using the keyboard 38. The exact start of the rethermalization cycle will depend upon the length of the cycle and the desired serving time. It should be noted that while the refrigerator control panel 34 functions to initiate rethermalization, preferably, specific rethermalization heating cycles for each heater 126 are determined by separate controllers, as will be fully described herein.

In a preferred embodiment, the user may program multiple serving times corresponding to the serving times for various meals such as breakfast, lunch and dinner. After these times have been programmed into the refrigerator control panel 34, onboard instructions will determine when the rethermalization cycle should be initiated. For example, if the programmed serving time is 8:00 a.m. and the rethermalization cycle lasts 45 minutes, refrigerator control panel 34 would provide power to the heaters 126 (FIG. 1) at 7:15 a.m. to begin the cycle.

Figure 1:
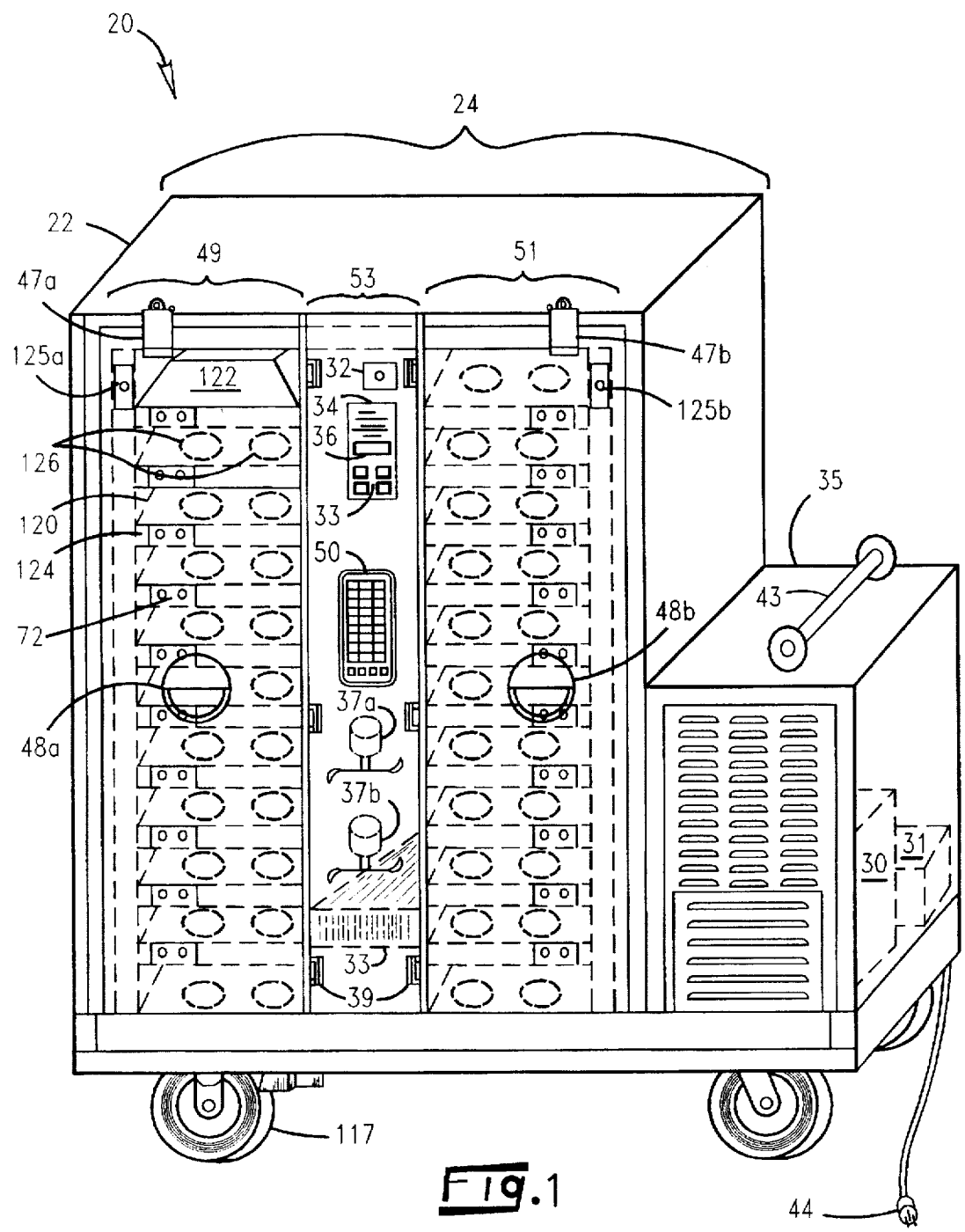
FIG. 1 is a somewhat diagrammatical broken-away view of the integrated refrigeration and rethermalization system showing the primary user accessible features.
Figure 2:
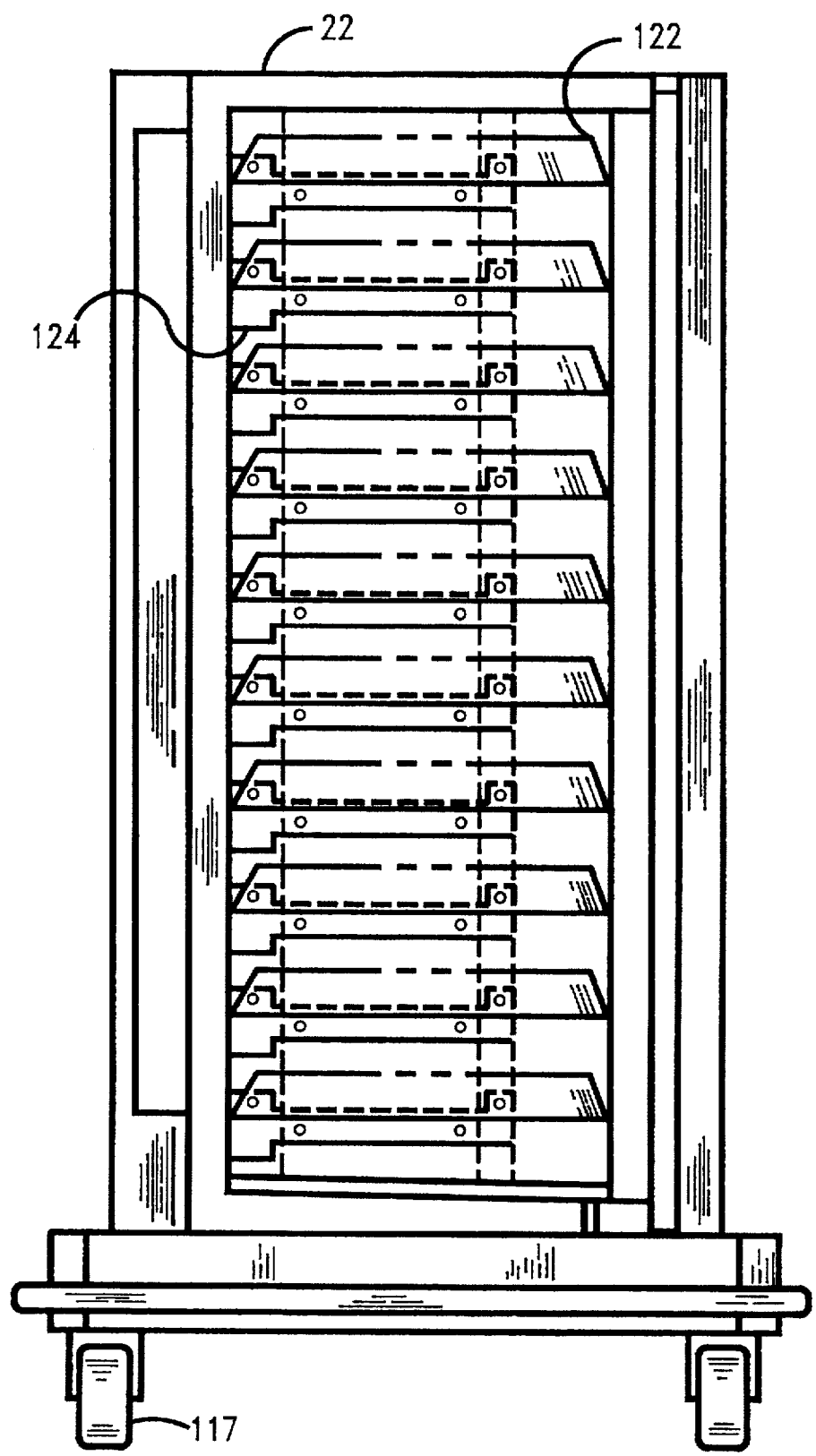
FIG. 2 is a cross-sectional side view of the refrigeration-rethermalization cart for use in the present system.
Figure 3:
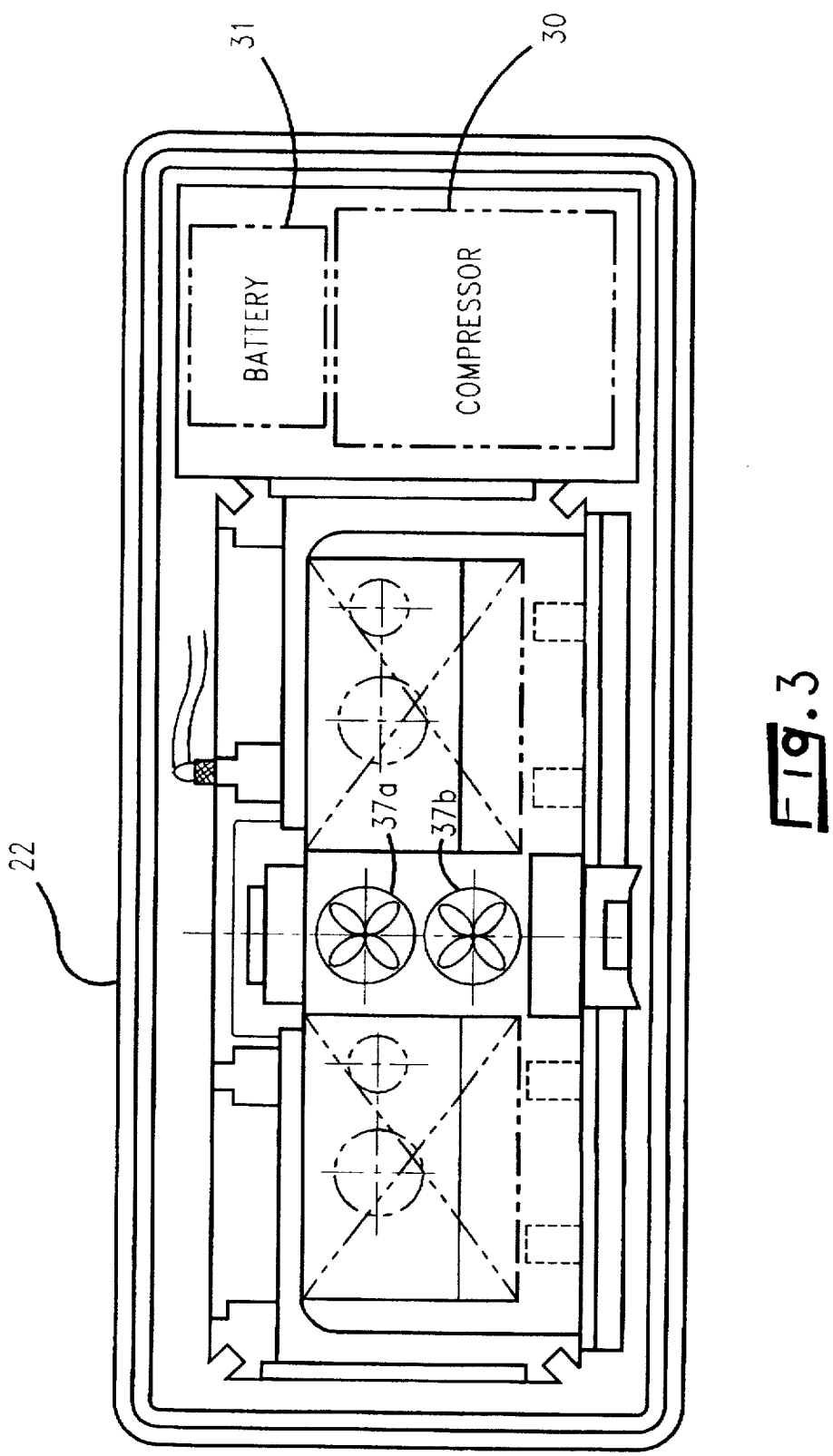
FIG. 3 is a cross-sectional top view of the integrated refrigeration and rethermalization system of the present invention.
Figure 5A:
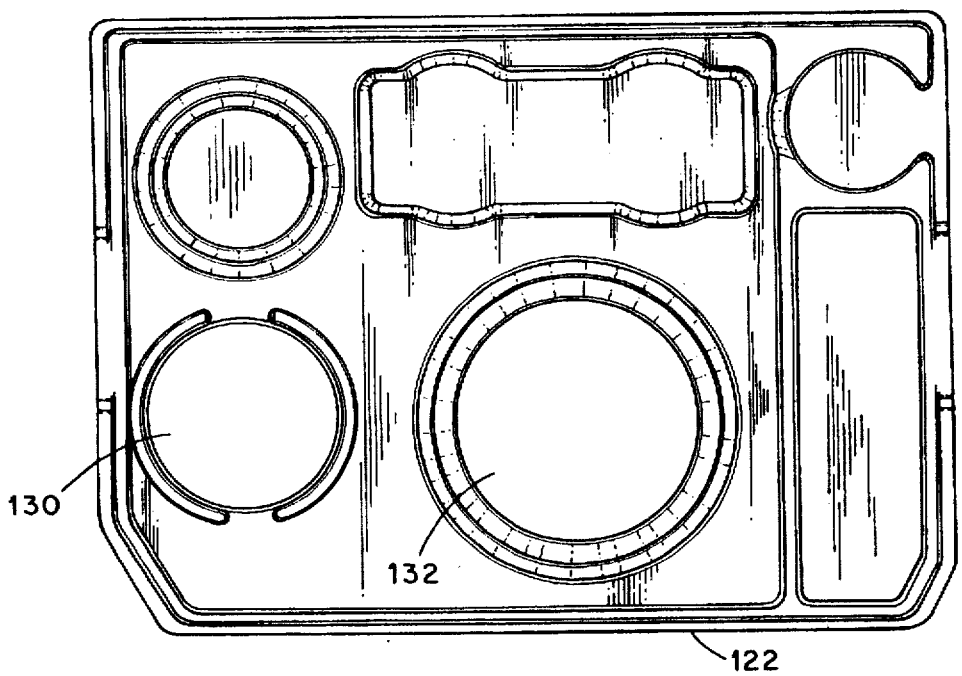
FIGS. 5A, 5B, and 5C are top, side, and perspective views of a food service tray for use in the present invention.
Figure 5B:
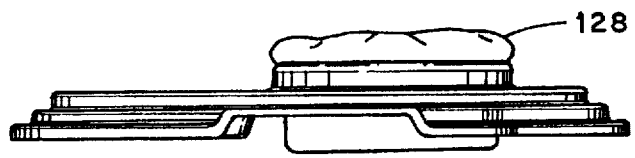
Figure 5C:
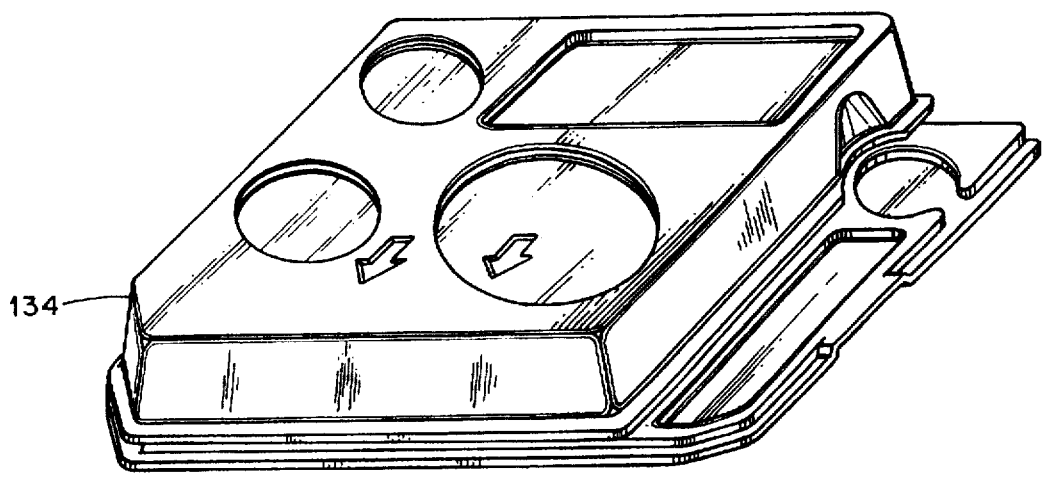

Referring now to FIGS. 5a, 5b and 5c, the construction and use of a preferred food tray 122 may be described. In use, the trays 122 are loaded with prepared meals with the food items to be rethermalized located within containers 128. These containers are placed in special holders 130 and 132 on the tray 122 which allow the bottom of the containers 128 to extend beyond the bottom of the tray 122. The trays are then covered to minimize drying out of the food and thermal convection with covers 134. These trays 122 are then placed within the cart 22 on the tray supports 120 (FIG. 1). The containers 128 are designed so that they contact the heater shelf 124 (FIG. 1) when the tray 122 is properly loaded. Thus, when the heaters are turned on, the food within the containers 128 contacting the heater shelf 124 will be rethermalized.

At the rethermalization initiation time programmed into the refrigerator control panel 34, power 88 (FIG. 7) is supplied to the heaters 126 to initiate rethermalization of selected portions of the food on trays 122. Positioned immediately below the refrigerator control panel 34 is an easily accessible rethermalization control panel 50 which enables the user to program specific rethermalization heating cycles, or rethermalization programs, for individual heaters 126, and provides user feedback indicating the status of each heater 126. The rethermalization control panel 50 also enables the user to adjust the rethermalization programs. It will be appreciated that placement of the rethermalization control panel 50 in such close proximity to the refrigerator control panel 34 consolidates the user interface features in one easily accessible area of the cart, with full user control of the refrigerator 41 and heaters 126. It will be further appreciated and understood that the refrigerator control panel 34 and rethermalization control panel 50 may be combined, and their functions integrated, into a single integrated control panel that is equally accessible and functional to the user.

Figure 6:
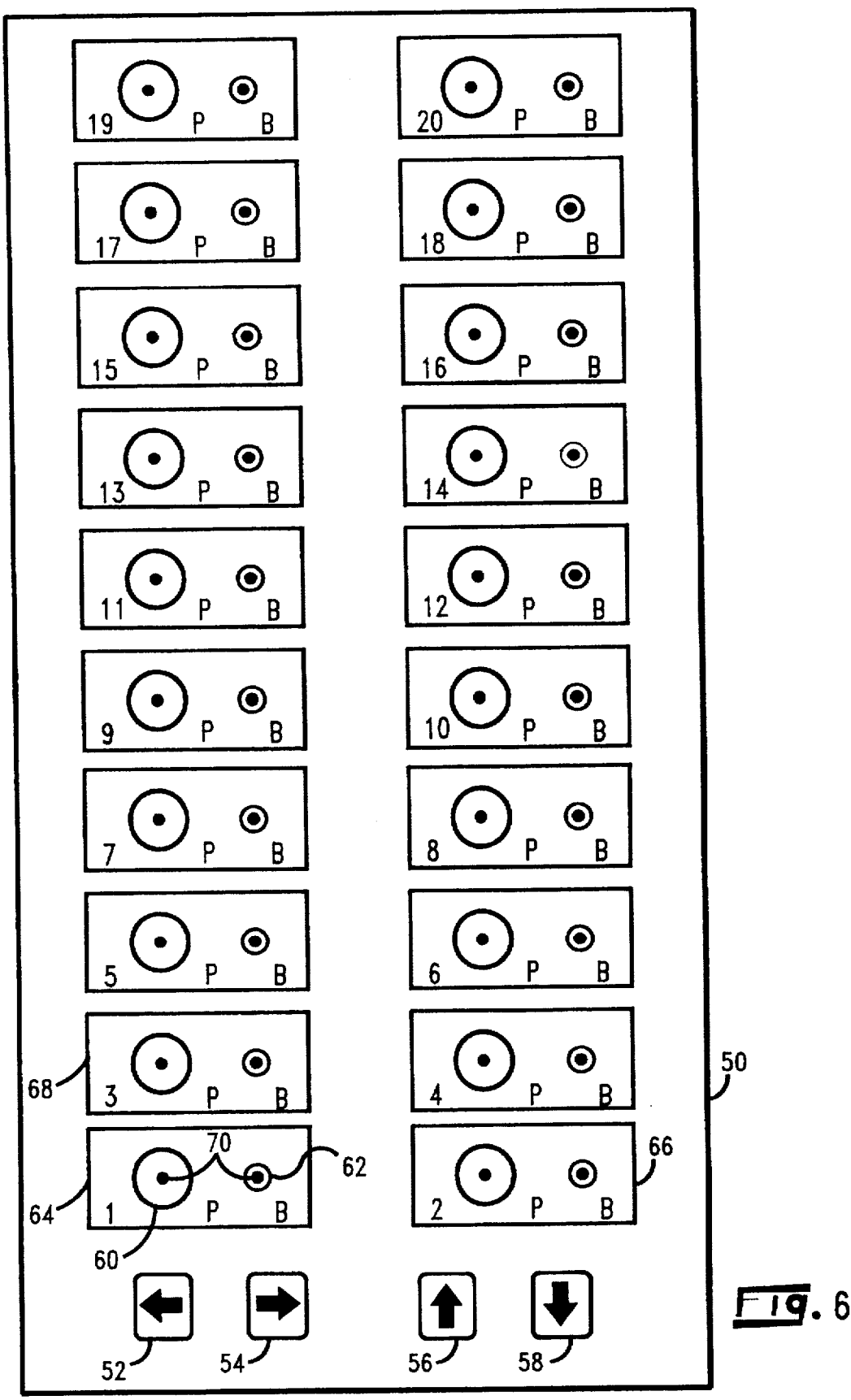
FIG. 6 is a view of the rethermalization control panel.

FIG. 6 shows the rethermalization control panel 50 in greater detail. The data entry keys 52, 54, 56, and 58 are used by the operator to adjust the heating programs. For each heater 126 in the cart 22 there is an LED 70 which indicates the current state of operation for the heater 126, as discussed in more detail below. In this depiction each LED 70 is circled by either a large diameter ring 60 or a small diameter ring 62. A large diameter ring 60 and associated LED 70 represent the state of operation for a plate heater 126 in the cart 22, and a small diameter ring 62 and associated LED 70 represent the state of operation for a bowl heater 126. A set of LED's 70 for both a plate and a bowl represent the heaters on a single shelf 124, as depicted by box 64. There are two shelves 124 in this depiction, 64 and 66, for each level within a cart 22. One of the shelves 124 on a single level is accessed from one side of the cart 22, and the other shelf 124 on the same level is accessed from the other side of the cart 22. The depiction 68 represents a shelf 124 on another level of the cart 22. In this example there are ten levels in the cart 22, for a total of 20 shelves 124, and 40 heaters 126. It will be appreciated that there could be any number of heaters 126 on a shelf 124, shelves 124 on a level, and levels within a cart 22.

As mentioned above, the LED 70 represents the current state of operation for each heater 126. If the LED 70 for a particular heater 126 is lit, it means that both the heater is supposed to be energized according to the current program, and that the heater 126 is actually receiving current. If the LED 70 is not lit, it means that both the heater 126 is not supposed to be energized according to the current program, and that the heater 126 is not receiving current. If the LED 70 is flashing, it means that either the heater 126 is supposed to be energized according to the current program, and that the heater 126 is not receiving current, or that the heater 126 is not supposed to be energized according to the current program, and that the heater 126 is actually receiving current. To simplify then, when the LED 70 is lit, the heater 126 is properly energized according to the program; when the LED 70 is off, heater 126 is properly unenergized according to the program; and when the LED 70 is flashing, it is an indication that the heater condition differs from the program.

FIG. 7 is a block diagram showing an overview of the integrated control system 40, which includes the refrigerator control panel 34, rethermalization control panel 50, and first and second controllers 76 and 78. The integrated control system 40 is an integral part of the refrigeration and rethermalization system 20 (FIG. 1), being positioned onboard the cart 20 and continuously connected to the refrigerator 41 and heaters 126 to provide integrated control thereof. A digital timer 86 enables proper timing of programmed heating cycles (rethermalization programs). For example, at a time previously programmed, the timer circuit 86 allows power to flow from power source 88, which is typically a 208 V/AC wall outlet, to the heaters 126. The cart 22 is equipped with an appropriate power plug 44 for interfacing the power source 88 with the refrigerator control panel 34. The heating cycle desired for each heater 126 has previously been entered by the operator using the rethermalization control panel 50 on the front of the cart 22. The first controller 76 accepts input from the rethermalization control panel 50, and stores the programs in program storage 80. When energized, the first controller 76 sends the program data input by the operator to the second controller 78 on lines 90. The second controller 78 stores the received program data in its own program storage 82.

The second controller 78 then sends current to the heaters 126 according to the programming it has received from the first controller 76, through lines 92, 94, and 96. In FIG. 7 there is shown just a single heater 126, but it will be understood that this example extends to as many heaters as there may be in the cart 22, and that there may be multiple second controllers 78.

Referring now to the wiring diagram shown in FIGS. 8A-E, in a preferred embodiment the second controller 78 depicted in FIG. 7 represents one microprocessor based controller board 202–210 for every eight heaters 126 in the cart 22 (FIG. 1). Thus there is one controller card for the eight heaters 126 on four shelves 124 on two levels in the cart 22. In a preferred embodiment there are ten different levels, therefore, the second controller 78 of FIG. 7 represents five controller boards. Therefore, heater 126 in FIG. 7 represents forty heaters 126 connected to five controller cards in the second controller 78, and in a similar manner, current sensor subsystem 84 represents forty current sensors and associated subsystems. Thus, preferably, the first controller 76 controls five controller boards.

In the current loop 92, 94, and 96 is located a current sensor subsystem 84, which senses if the heater 126 is actually drawing current. The current sensor subsystem 84 acts as an operation sensor for the heater 126. If for some reason there is an open in any of the lines 92, 94, or 96, or if the element in the heater 126 has broken, then the current sensor subsystem 84 will not sense any current, and will be in an OFF state. But if everything is operating properly, then the current sensor subsystem 84 will sense current, and will be in an ON state.

The current sensor subsystem 84 reports whether or not it senses current to the second controller 78 on lines 98. The second controller 78 then compares the state of the current sensor subsystem 84 to the program for the specific heater 126 held in memory 82, which may be termed the controller state for the heater 126, and determines if the current sensor subsystem 84 state is the same as the controller state, or in other words if the heater is functioning according to the program supplied. Thus, the second controller 78 acts as a comparator for the operation sensor state and the controller state, and sends a status, or comparator, signal based on this comparison on lines 90 to the first controller 76, which will control the LED 70 for the associated heater 126 according to the value of this status signal.

If a high comparator signal is sent, it is an indication that the controller state and the operation sensor state agree, and the heater 126 is in an ON state. If a mid comparator signal is sent, it is an indication that the controller state and the operation sensor state agree, and that the heater 126 is in an OFF state. If a low comparator signal is sent, it is an indication that the controller state and the operation sensor state disagree.

As mentioned in more detail above, the LED 70 can either be steadily lit in response to a high comparator signal, or can be flashing in response to a low comparator signal, or can be off in response to a mid comparator signal.

The first controller 76 is programmed according to the following procedure. With reference again to FIG. 6, the single time and temperature selection mode is entered by pressing and holding simultaneously for one second data entry keys 54 and 56. All LED's 70 will flash on and then off one time to confirm the keystroke. Next key 54 is pressed and held for one second, and once again all the LED's 70 will flash to acknowledge the keystroke. Then keys 52 and 54 are pressed and held simultaneously for one second, and again the LED's 70 will flash to acknowledge. Finally keys 54 and 56 are again pressed and held for one second, with the LED's again acknowledging. The first controller 76 is now in the single time and temperature program mode.

At this point the LED 70 in the lower left hand corner of the rethermalization control panel 50 will be the only LED 70 illuminated. The operator will select the heater 126 to be programmed by using the data entry keys 52, 54, 56, and 58 to move the location of the lit LED 70 to indicate the position of the heater 126 to be programmed. The position of the lit LED 70 will move according to the direction of the arrow on the data entry key 52, 54, 56, or 58 actually pressed. Pressing keys 52 and 54 simultaneously for one second will select the heater 126 corresponding to the position of the lit LED 70, and the lit LED 70 will begin to flash to indicate that it has been selected.

While the LED 70 for the selected heater 126 continues to flash, the LED 70 corresponding to the currently programmed time and temperature curve will illuminate. The data entry keys 52, 54, 56, and 58 are once again used to scroll about the display of the rethermalization control panel 50, until the LED 70 corresponding to the desired time and temperature curve is illuminated. A manual or data sheet listing the curves available, and the location of the corresponding LED 70 is provided to the operator so that he can determine which time and temperature curve is associated with each LED 70.

When the LED 70 corresponding to the desired time and temperature curve is illuminated, data keys 52 and 54 are pressed and held simultaneously for one second. At this point the first controller 76 sends the chosen program to the second controller 78, and the first controller 76 then returns to a point in the time and temperature curve programming mode where another LED 70 corresponding to another heater 126 which is to be reprogrammed can be selected. To exit the single time and temperature mode, data keys 56 and 58 are pressed and held simultaneously for one second. All LED's 70 will flash, and then the first controller 76 and the rethermalization control panel 50 will resume a normal mode of operation.

If it is desired to change the program associated with all heaters 126 at the same time to the same program, a global time and temperature selection mode may be accessed by pressing and holding simultaneously for one second the data keys 56 and 58. Again, all LED's 70 will flash to annunciate. Next, data key 54 is pressed and held for one second, with a subsequent annunciation. Then keys 52 and 54 are simultaneously pressed and held for one second, with the LED's 70 again annunciating. Finally the keys 56 and 58 are again simultaneously pressed and held for one second, with LED annunciation, and the first controller 76 is in the global time and temperature programming mode.

At this point the LED 70 in the lower left hand corner of the rethermalization control panel 50 will be the only LED 70 illuminated. The data entry keys 52, 54, 56, and 58 are once again used to scroll about the display of the rethermalization control panel 50, until the LED 70 corresponding to the desired time and temperature curve is illuminated. Again, the operator refers to a manual or data sheet listing the curves available and the location of the corresponding LED 70.

When the LED 70 corresponding to the desired time and temperature curve is illuminated, data keys 52 and 54 are pressed and held simultaneously for one second. At this point the first controller 76 sends the chosen program to the second controller 78, and the first controller 76 and the rethermalization control panel 50 will resume a normal mode of operation.

While the key sequences used above are exemplary only, the programming sequence for the first controller 76 using the rethermalization control panel 50 is deliberately intricate and obtuse to prevent inadvertent or unauthorized program modification.

Figure 9:
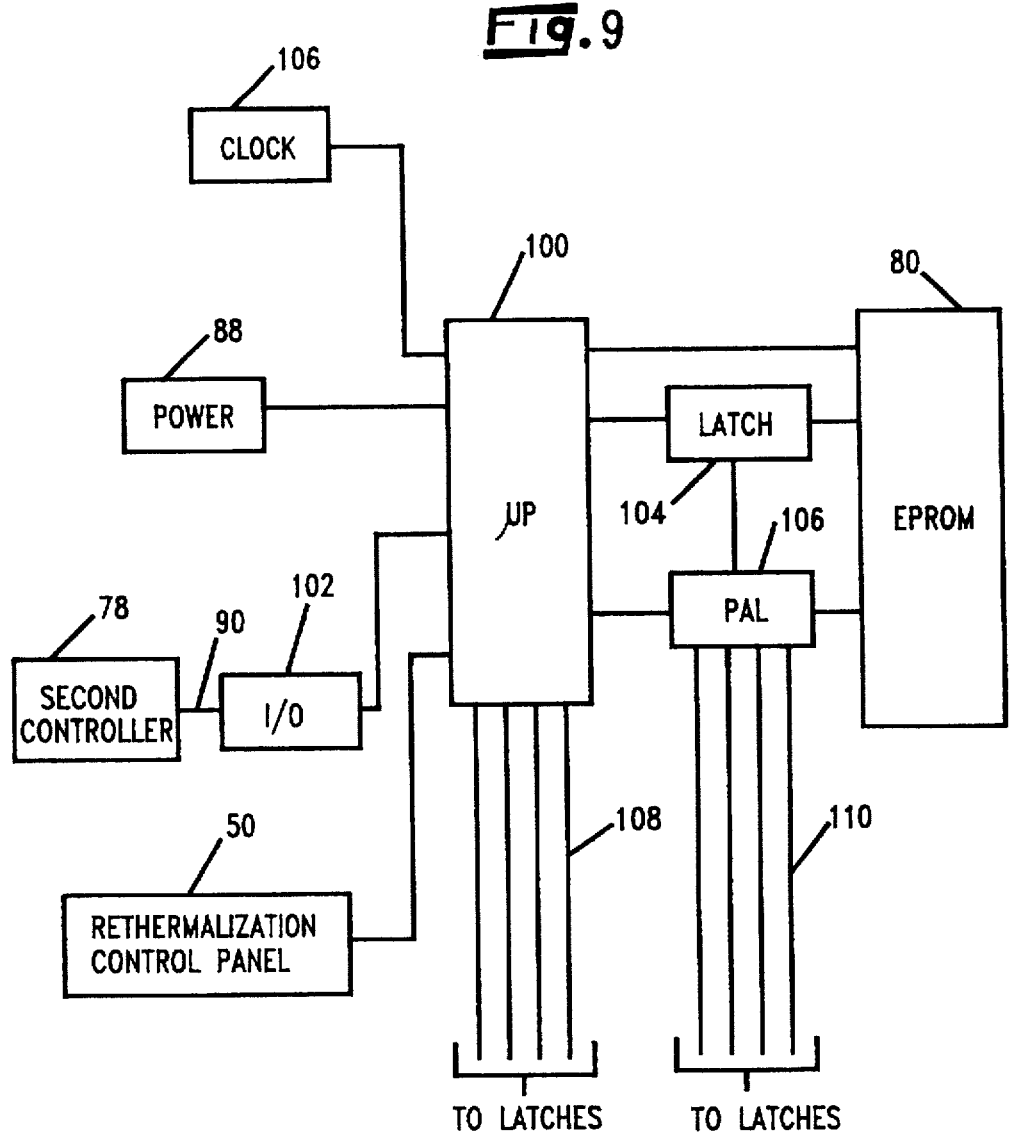
FIG. 9 is a block diagram of the first controller.
Figure 10:
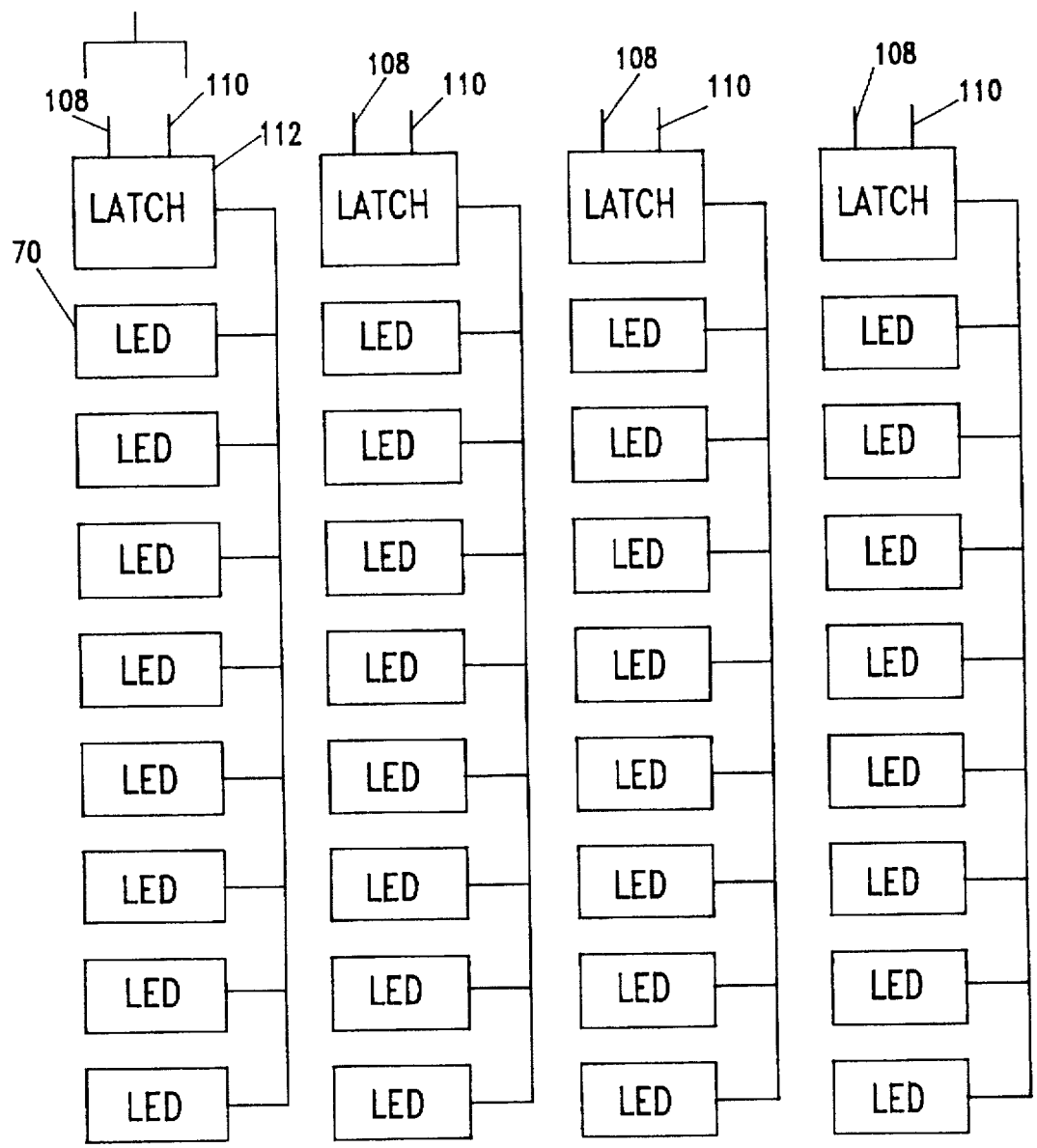
FIG. 10 is a block diagram of the LED display portion of the rethermalization control panel.
Figure 17:
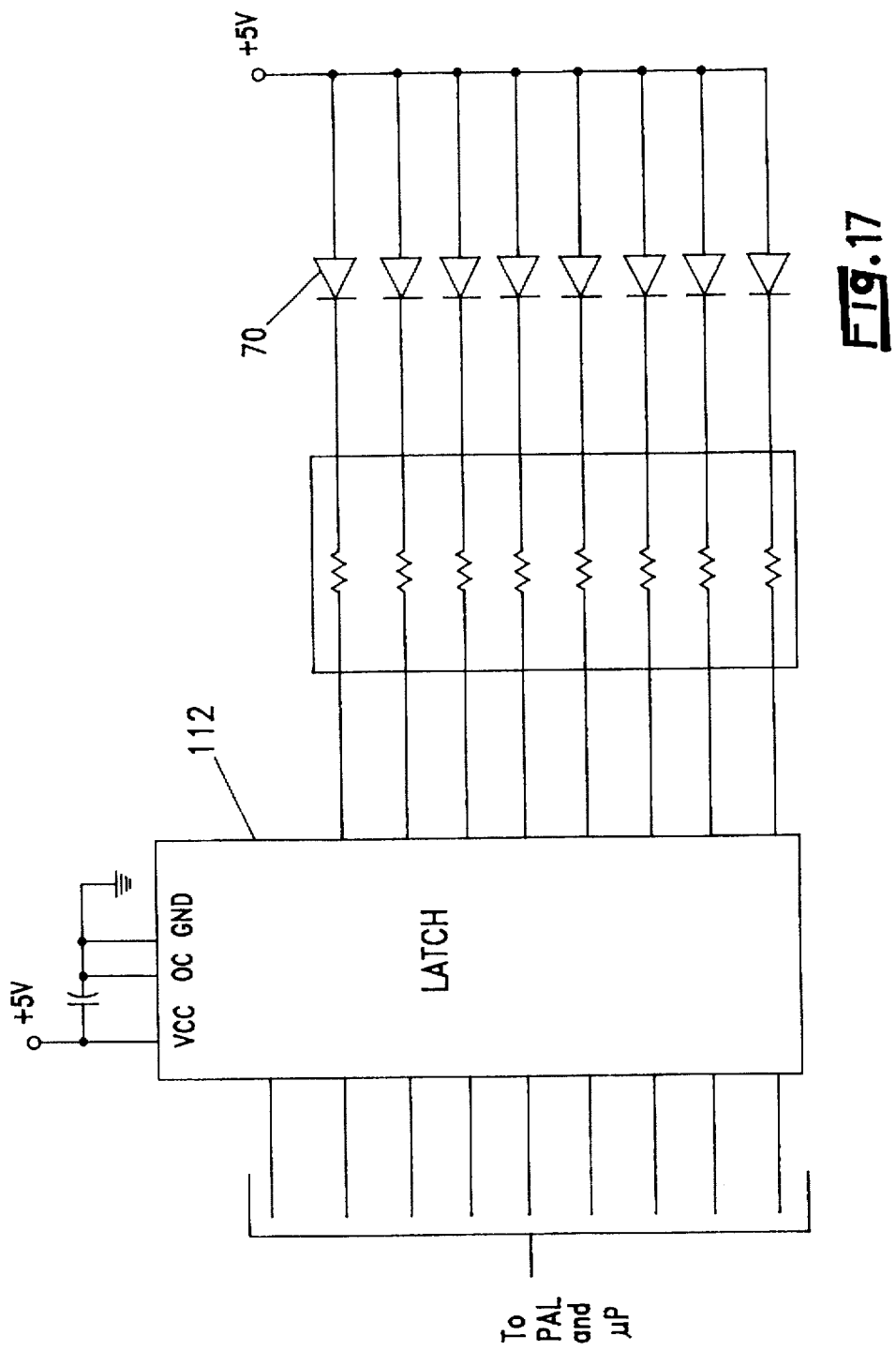
FIG. 17 is a schematic diagram of the LED display portion of the rethermalization control panel.
Figure 18:
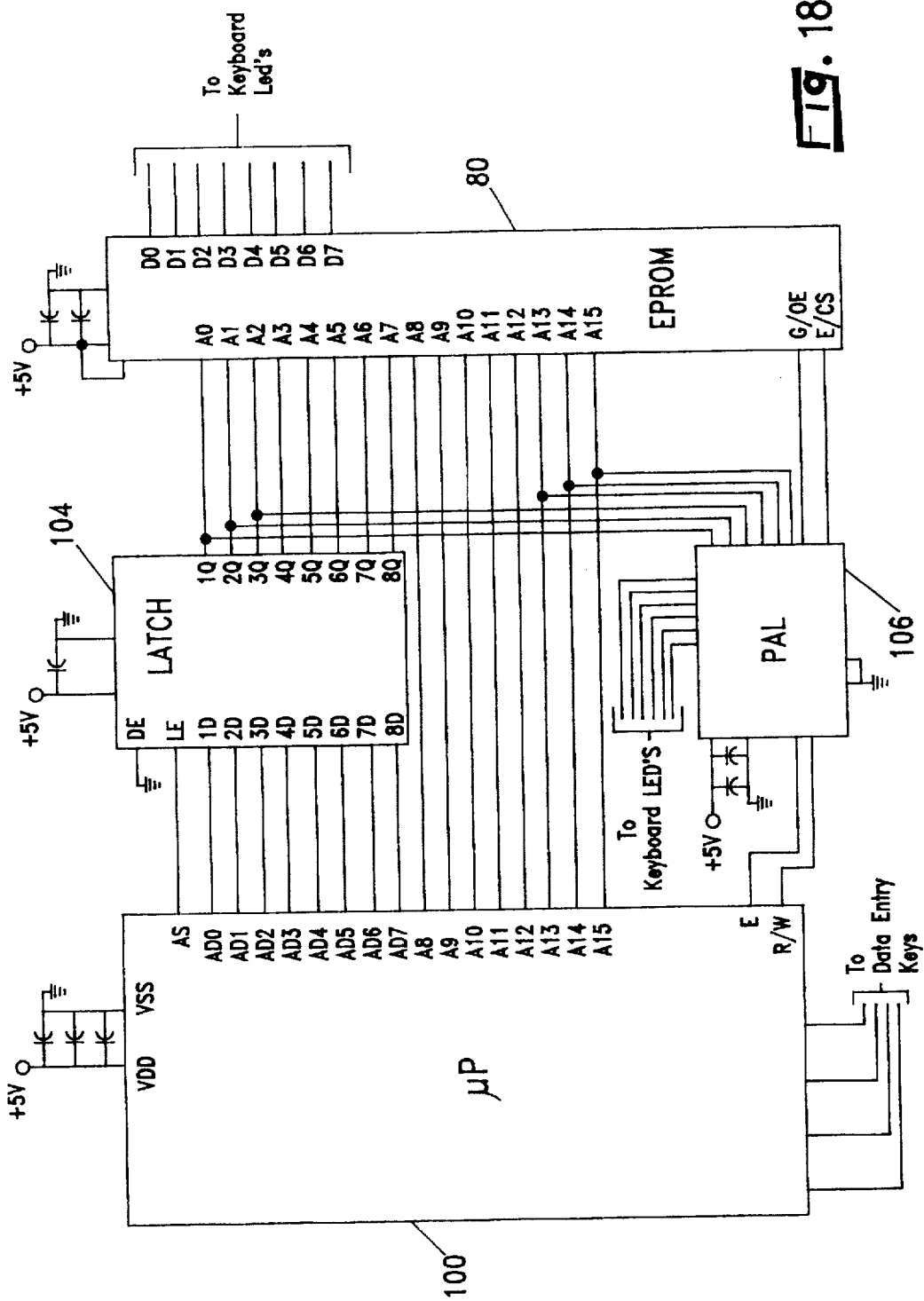
FIG. 18 is a schematic diagram of part of the first controller.
Figure 19:
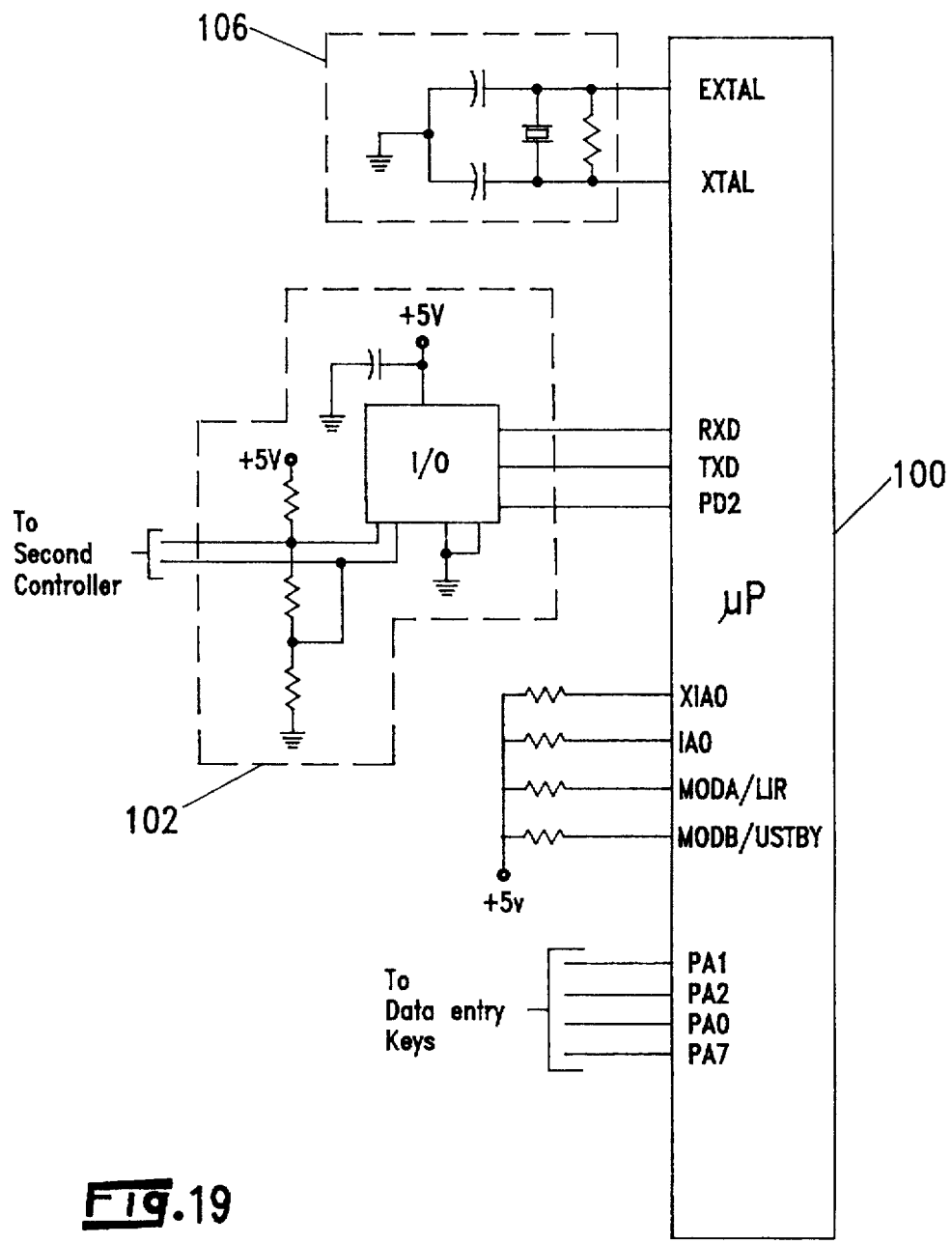
FIG. 19 is a schematic diagram of part of the first controller.

In FIG. 9 is shown in diagram form the elements of the first controller 76. The heart of the first controller 76 is a microprocessor 100, which in a preferred embodiment is a Motorola MC68HC11A1FN microprocessor. As this is an eight bit microprocessor, and it is desired to use 16 bit data words, a latch 104 is placed between the microprocessor 100 and the EPROM program storage memory 80, which is a 16 bit device, such as model number TMS27C128JL manufactured by Texas Instruments. A suitable latch is model number SN74HC373N manufactured by Texas Instruments. The microprocessor 100 and a programmable array logic device 106 (PAL) control the latches 112, shown in FIG. 10, by means of lines 108 and 110, which in turn control the operation of the individual LED's 70 of the rethermalization control panel 50. In a preferred embodiment, the PAL 106 is an AMD model number PALCE16V8H-25PC/4, and the LED's 70 are model numbers HLMP-D150 made by HewlettPackard. The microprocessor 100 also receives input from the data input membrane keys 52, 54, 56, and 58 of the rethermalization control panel 50. Schematics of the components described in FIGS. 9 and 10 are shown in FIGS. 17, 18, and 19.

Figure 11:
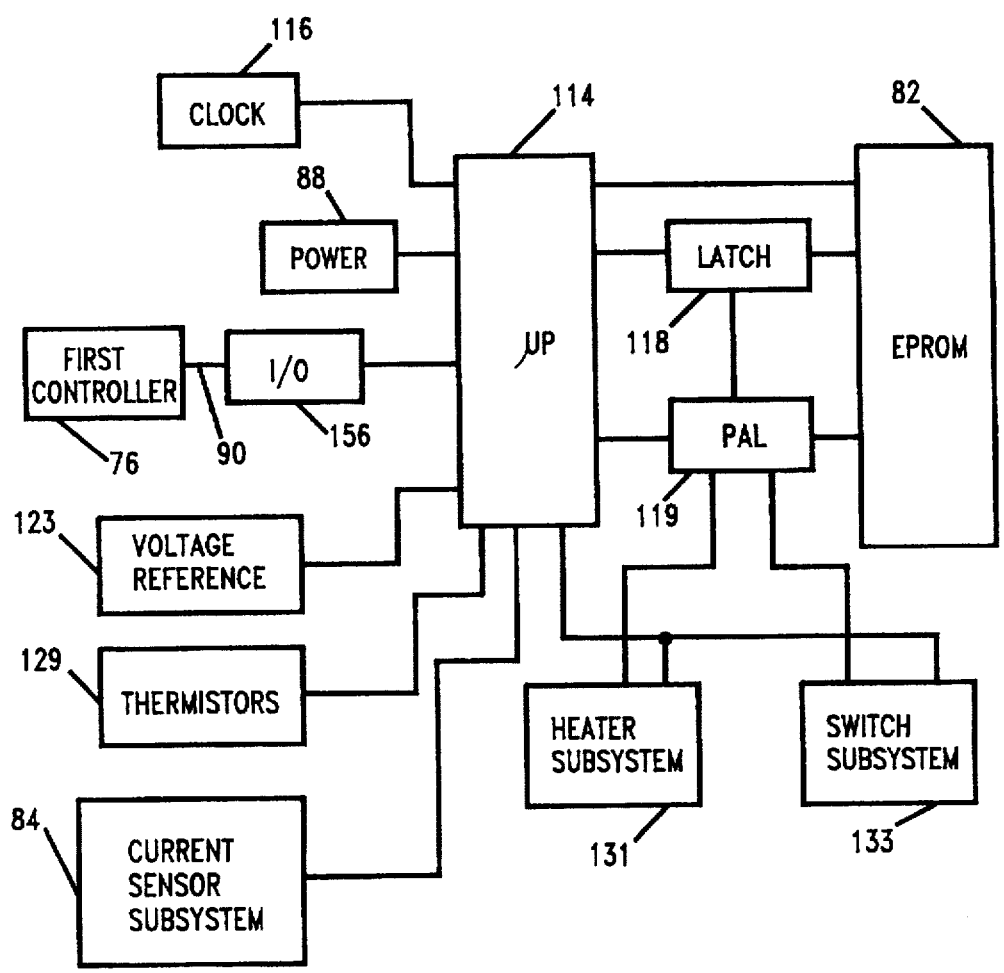
FIG. 11 is a block diagram of a second controller.

The second controller 78 is shown in FIG. 11. The microprocessor 114 receives information on heater programs from the first controller 76 on lines 90, and using a latch 118 in a manner similar to that described above, stores the program in EPROM 82. The microprocessor 114 and the PAL 119 control the heater subsystem 131 and the switch subsystem 133. The microprocessor 114 also sends and receives data from the voltage reference 123, the thermistors 129, and the current sensor subsystem 84.

Within each heater 126 there is located a thermistor 129. The thermistor 129 is a temperature sensing device such as model 9RT1H5B5 from Midwest Components, which sends a voltage signal back to the microprocessor 114. By comparing the voltage signal sent by the thermistor 129 to the voltage reference 123, the microprocessor 114 can determine the temperature of the heater 126, and can adjust the power to the heater 126 as is appropriate by controlling the heater subsystem 131. As has been previously explained, the microprocessor 114 also receives data from the current sensor subsystem 84 as to whether the heater 126 is actually drawing current, compares this to the program for the heater 126 stored in the EPROM 82, and sends a status signal back to the first controller 76 on lines 90.

The switch subsystem 133 is a manual override, wherein the operator can manually turn off both heaters 126 on a single shelf 124 by turning off a switch 72 located on the shelf 124. This may be easier than changing the programming via the rethermalization control panel 50 if, for example, a shelf is to be left empty for only a single meal.

Figure 12:
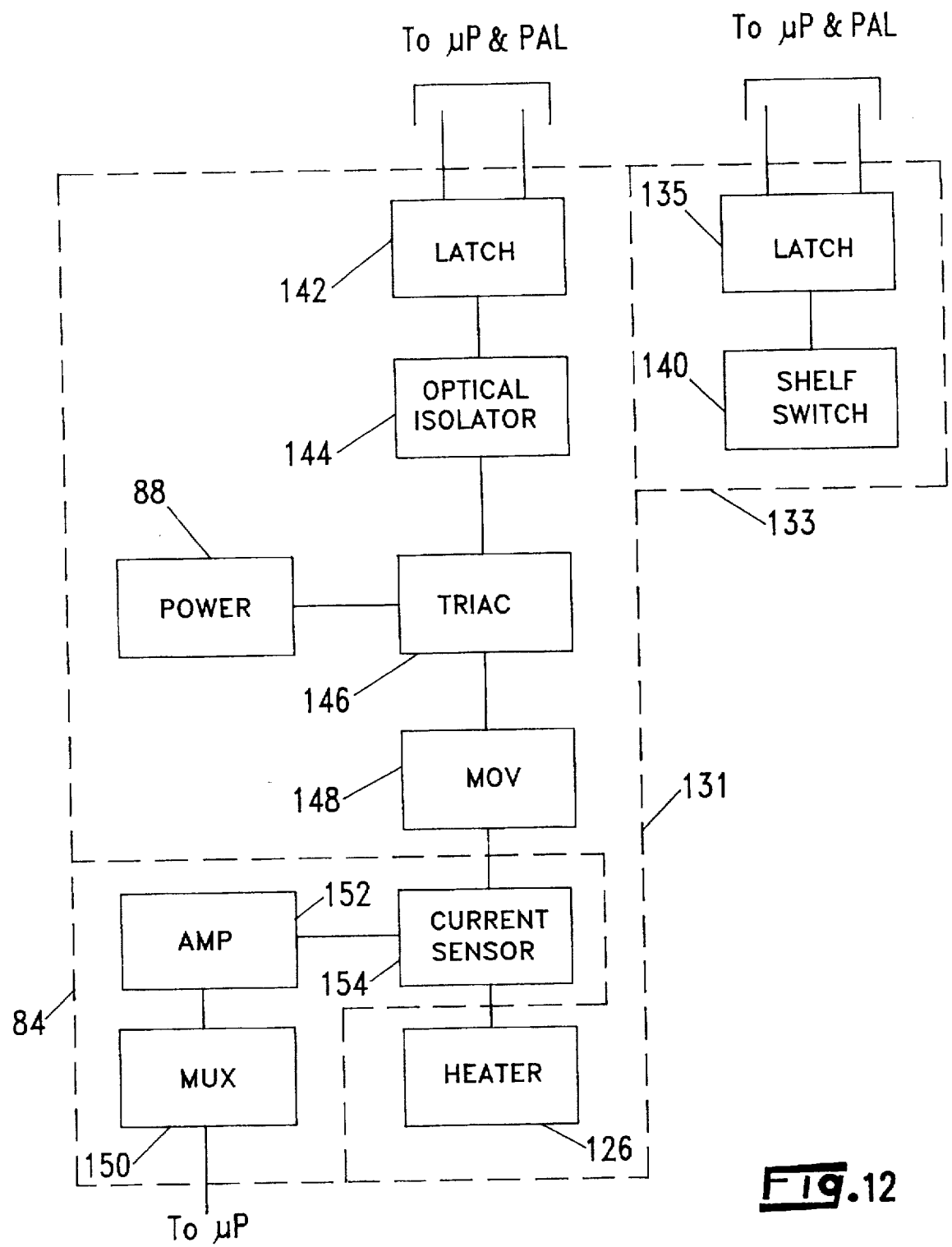
FIG. 12 is a block diagram of the switch, heater, and current sensor subsystems.

The current sensor subsystem 84, heater subsystem 126, and switch subsystem 133 are shown in greater detail in FIG. 12. The latch 142 of the heater subsystem 126 receives information from the microprocessor 114 and the PAL 119. The latch 142 is isolated from the power used to energize the heaters 126 by an optically isolated triac driver 144, such as a Motorola model MOC3063. A triac 146, such as a Motorola T2500N, and MOV 148, such as a Harris V300LA4, are used by the microprocessor 114 to regulate the current received by the heater 126. By adjusting in this manner the length of time that the heater 126 receives full power, commonly called the duty cycle, the microprocessor 114, based on feed back from the thermistor 129, is able to keep the heater 126 at the temperature requested by the program. The current to the heater 126 flows through the current sensor 154, which in a preferred embodiment is a current transformer manufactured by Pulse Engineering as model number PE-67100, which sends a signal to amplifier 152, which is a Motorola LMT324N, which is passed along to the MUX 150, a Motorola MC74HC151N, which sends the signals received for all heaters 126 to the microprocessor 114, which, as has been explained, reports on the status of the heaters to the first controller 76.

Figure 13:
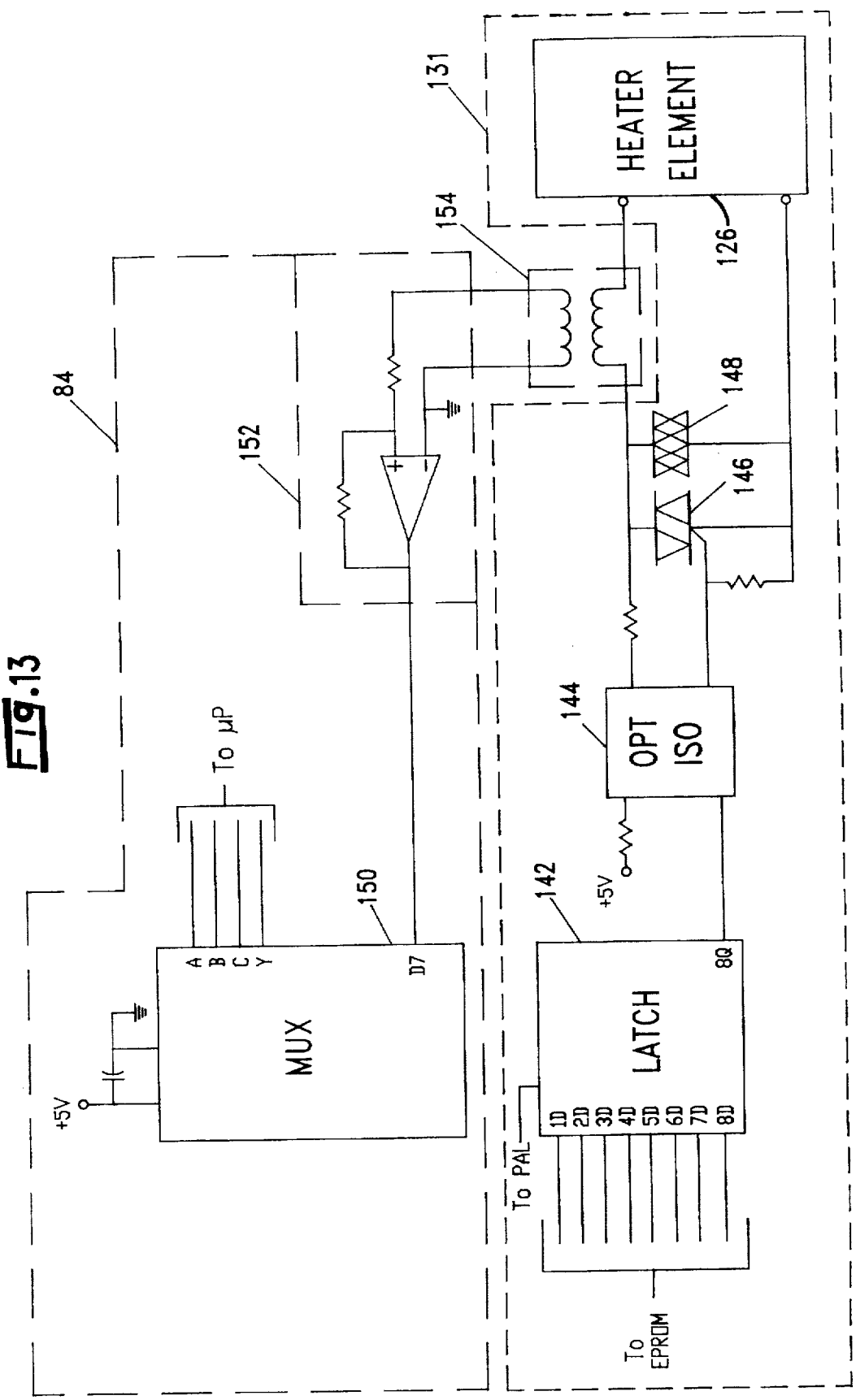
FIG. 13 is a schematic diagram of the heater and current sensor subsystems.
Figure 14:
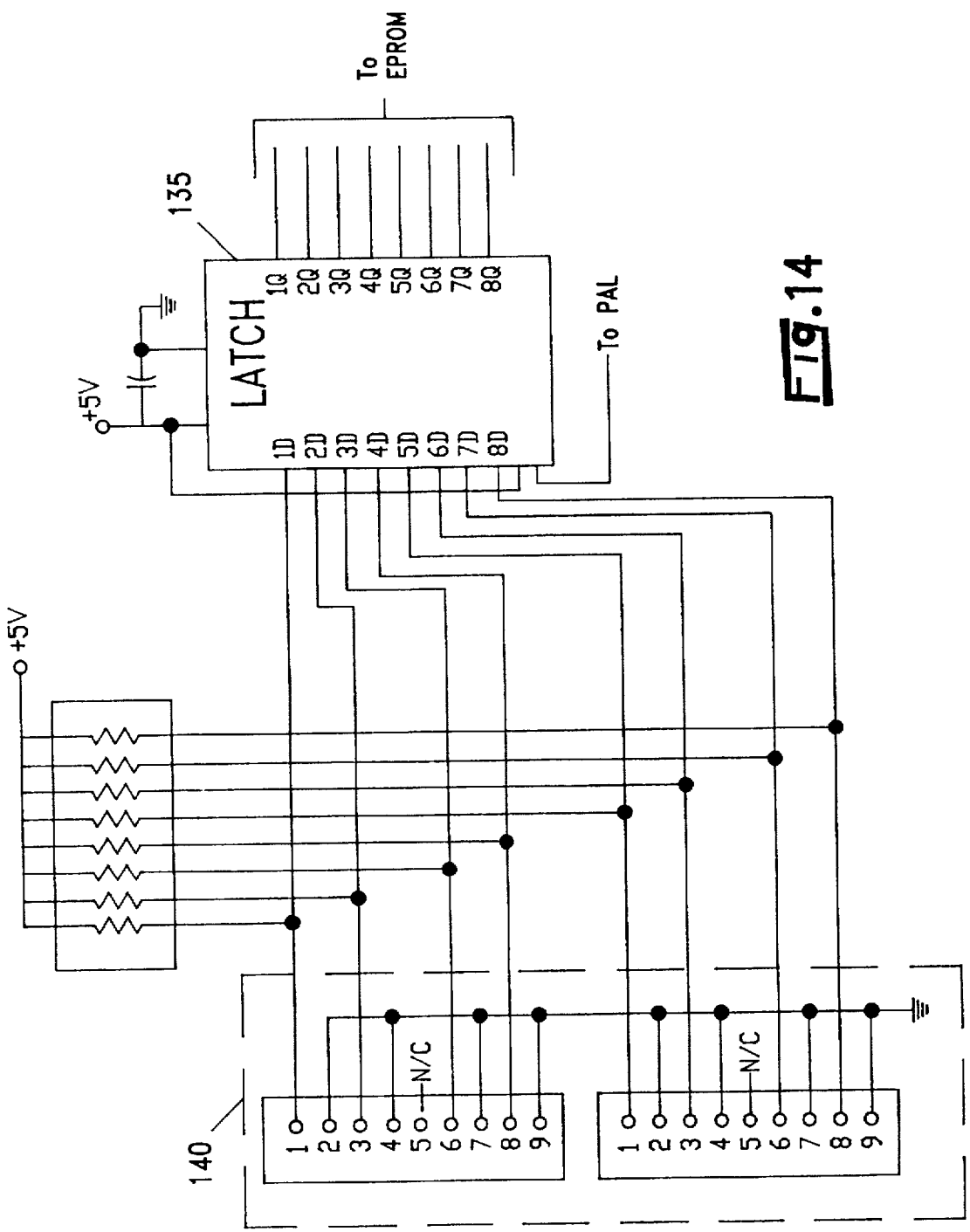
FIG. 14 is a schematic diagram of the switch subsystem.
Figure 15:
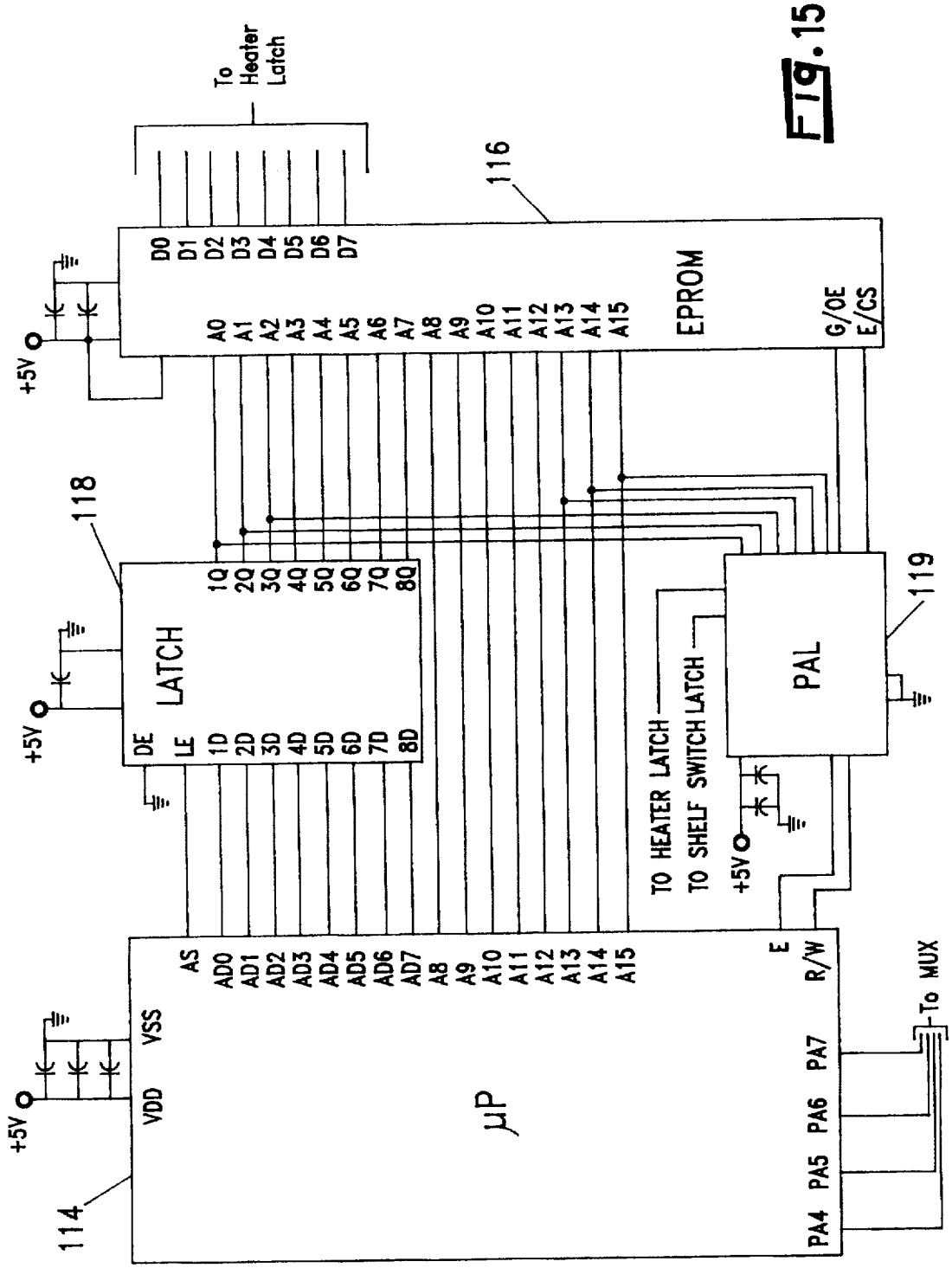
FIG. 15 is a schematic diagram of part of the second controller.
Figure 16:
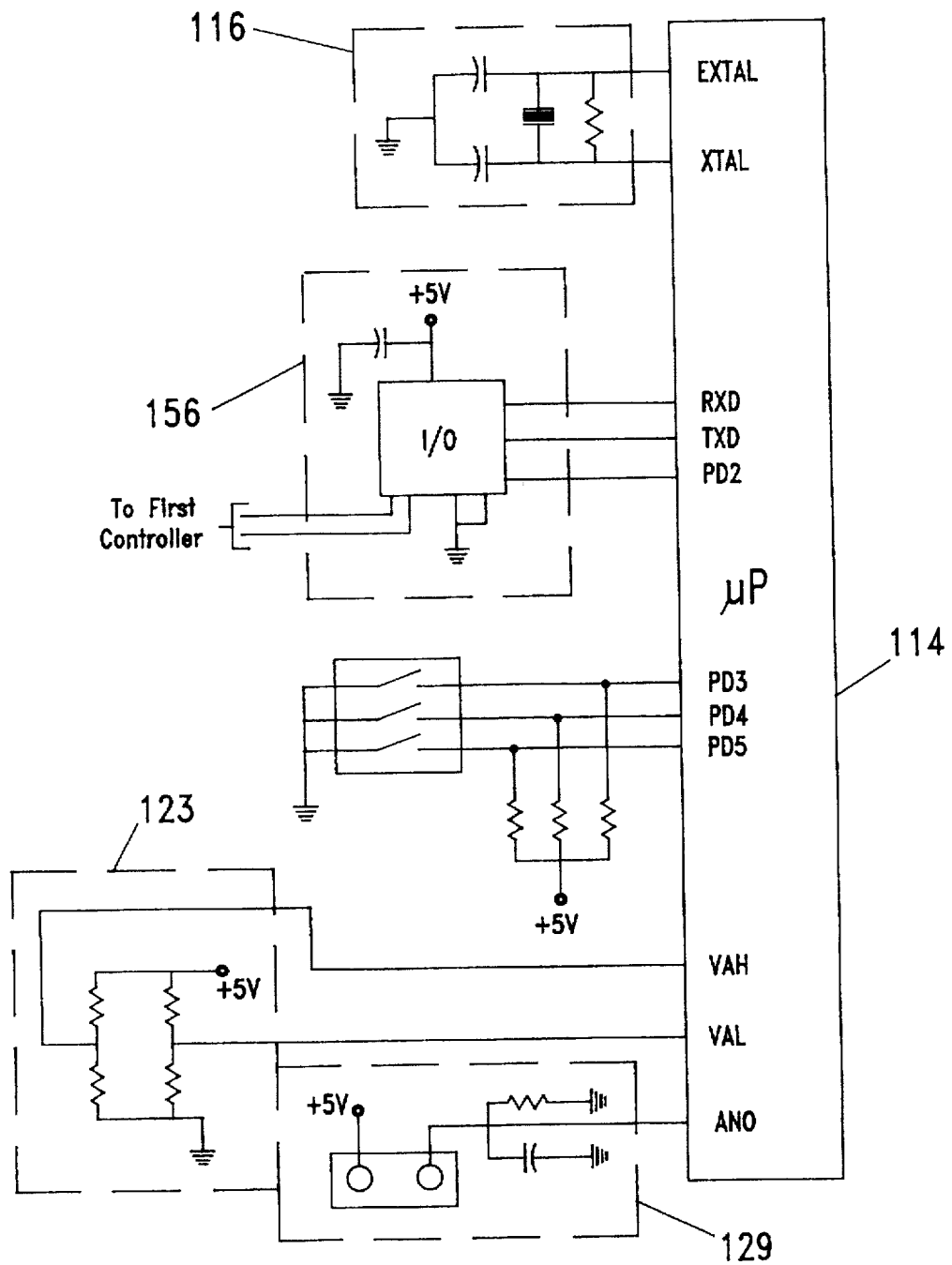
FIG. 16 is a schematic diagram of part of the second controller.

A schematic diagram of the heater subsystem 131 and the current sensor subsystem 84 circuits are shown in FIG. 13, and a schematic for the shelf switch subsystem 133 is shown in FIG. 14. Additional schematics for the second controller 78 are shown in FIGS. 15 and 16. In each figure the reference characters correspond to like reference characters discussed above with reference to FIGS. 1–12, and these later FIGS. 13–16 provide additional details as to a preferred embodiment.

With an understanding of the basic features of the invention, the general functioning of the overall rethermalization system may be described. In use, the rethermalization cart would be loaded with refrigerated or frozen prepared meals by placement of trays within the cart. In one embodiment, the cart would then be taken to a location close to its serving location and connected to electrical power. An operator would then select the time and temperature curve as previously described, and input the desired meal serving time to set the appropriate starting time for the rethermalization cycle. Alternatively, time and temperature curve programming could be completed at the time and place of loading the cart with food since the refrigeration and rethermalization systems, including user interfaces, are all integrated into the cart.

Figure 20:
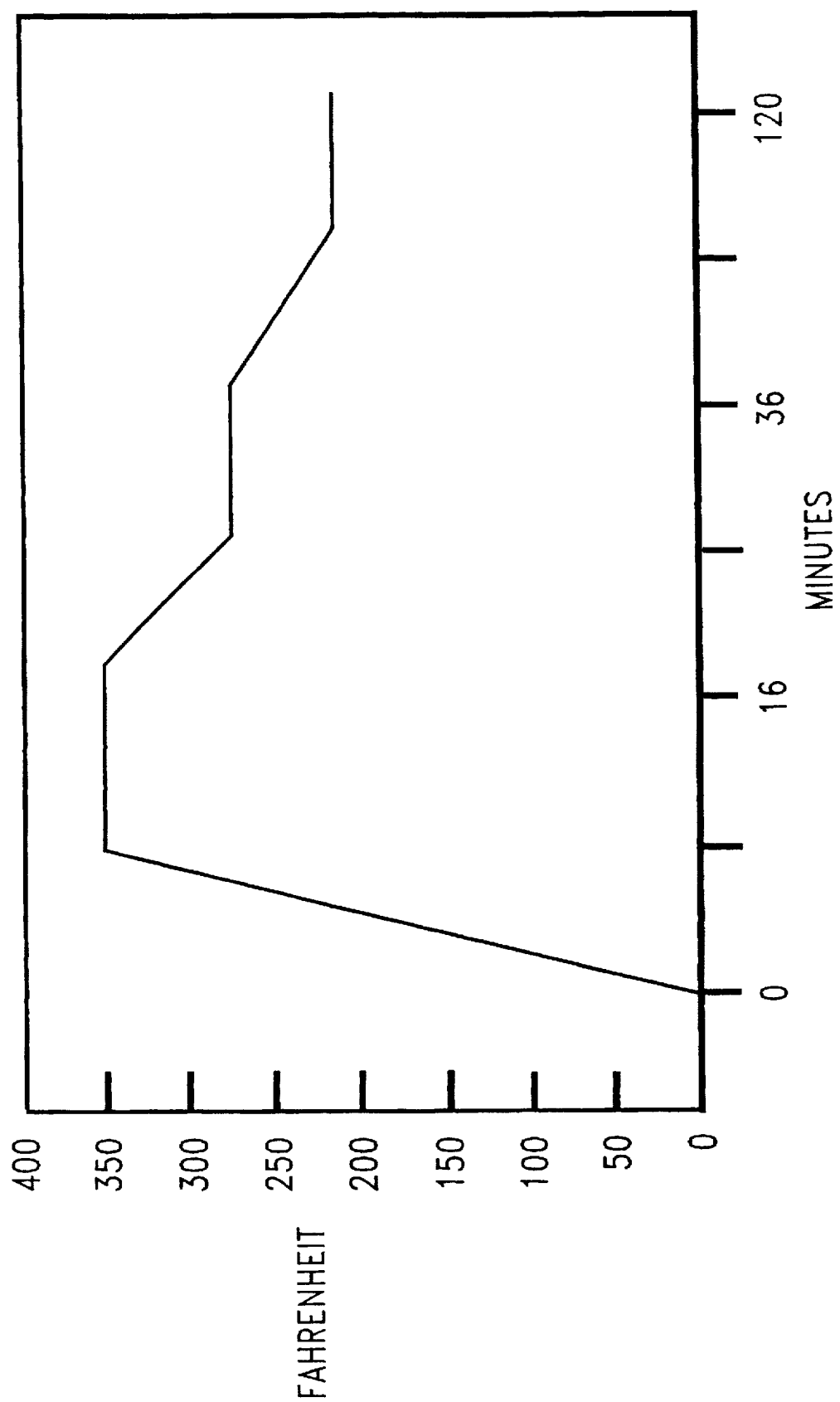
FIG. 20 is a graph representing a preferred rethermalization program.

Referring now to FIG. 20, a graph of a time versus temperature curve shows a preferred rethermalization control program. In a preferred program, the triacs previously described provide full power to the individual heating elements until a temperature of 350° F. is attained; by monitoring the various thermistors, the second controller can determine when each heating element has attained the desired temperature. The second controller varies the power supplied to the various heating elements through the triacs to maintain the desired temperature plus or minus 3° for a time interval of 16 minutes. During the second phase of the rethermalization cycle, power is reduced so that the temperature of the heating element is allowed to drop to about 270° F. Then the controller functions to maintain the 270° F. temperature plus or minus 3° until 36 minutes into the rethermalization cycle. In the final stage of a preferred rethermalization cycle, power is once again reduced to maintain a warming temperature of 210° F. plus or minus 5°. The second controller will function to maintain this hold temperature until power is removed from the rethermalization cart or the rethermalization program is canceled. Additionally, at the end of the rethermalization cycle the first controller signals an alarm in order to indicate that the cycle has been completed and the food is ready to serve. In a preferred embodiment, the first controller is capable of storing multiple serving times so that a full day's serving times may be programmed at one time. Thus, all that would remain to be done to prepare from one meal to the next would be to remove the meal that is ready and reload the cart with the next meal.

It is contemplated, and will be apparent to those skilled in the art from the specification and drawings that modifications and/or changes may be made in the embodiments of the invention. Accordingly, it is expressly intended that the foregoing are illustrative of preferred embodiments only, not limiting thereto, and that the true spirit and scope of the present invention be determined by reference to the appended claims.

What is claimed is:

1. An integrated refrigeration and rethermalization system for refrigerating and rethermalizing foods, for maintaining the foods in a refrigerated state until they are rethermalized, and heating certain foods to a desired temperature at a serving time while maintaining certain other foods in a chilled condition, comprising:

a plurality of trays for supporting food items thereon including food items to be rethermalized;

a refrigeration-rethermalization cart having at least one outer surface and at least one inner compartment, said plurality of trays disposed in the inner compartment;

a plurality of heater shelves having heaters disposed in the inner compartment under the trays for supporting the trays and selectively rethermalizing desired foods located on the trays;

a refrigerator for providing refrigerated air to the inner compartment of the cart to maintain foods on the trays in a refrigerated state until the foods are rethermalized;

a power supply for supplying power to said heaters and said refrigerator;

an integrated control system continuously connected to said refrigerator and said heaters for controlling the refrigeration and rethermalization of foods on the trays by controlling the power supplied to said heaters and said refrigerator;

at least one operation sensor disposed within the cart, having an ON state and an OFF state, a different one of each operation sensor associated with a different one of each of the heaters, for sensing electrical current through the associated heater, being in an ON state when electrical current through the associated heater is sensed, and being in an OFF state when electrical current through the associated heater is not sensed;

at least one comparator disposed within the cart, a different one of each of the comparators associated with a different one of each of the heaters;

for comparing the state of the controller associated with the heater against the state of the operation sensor associated with the heater;

for generating a high comparator signal associated with the heater when the state of the controller associated with the heater is on and the state of the operation sensor associated with the heater is on;

for generating a mid comparator signal associated with the heater when the state of the controller associated with the heater is off and the state of the operation sensor associated with the heater is off;

for generating a low comparator signal associated with the heater when the state of the controller associated with the heater is different from the state of the operation sensor associated with the heater; and at least one status indicator, a different one of each of the status indicators associated with a different one of each of the heaters, for providing a status output based on the comparator signal associated with the heater.

2. The apparatus of claim 1 wherein the status indicator further comprises an LED which flashes in response to the low comparator signal, is off in response to the mid comparator signal, and which is steadily lit in response to the high comparator signal.

3. An integrated refrigeration and rethermalization system for refrigerating and rethermalizing foods, for maintaining the foods in a refrigerated state until they are rethermalized, and heating certain foods to a desired temperature at a serving time while maintaining certain other foods in a chilled condition, comprising:

a plurality of trays for supporting food items thereon including food items to be rethermalized;

a refrigeration-rethermalization cart having at least one outer surface and at least one inner compartment, said plurality of trays disposed in the inner compartment;

a plurality of heater shelves having heaters disposed in the cart under the trays for selectively rethermalizing desired foods located on the trays;

a refrigerator for providing refrigerated air to the inner compartment of the cart to maintain foods on the trays in a refrigerated state until the foods are rethermalized;

a power supply for supplying power to said heaters and said refrigerator;

an integrated control system continuously connected to said refrigerator and said heaters, having a first microcontroller located on said cart containing an onboard clock and being programmable with a plurality of meal serving times for generating a start signal at a predetermined time interval before each programmed meal serving time, and a plurality of heater microcontrollers located on said cart connected between said supply of power and said heaters such that each of said plurality of heater microcontrollers is adapted to control the heaters located on at least one of said heater shelves and being responsive to said start signal for supplying and controlling power to said heaters in accordance with at least one rethermalization program;

memory means associated with said integrated control system for the storage of rethermalization programs;

at least one operation sensor disposed within the cart, having an ON state and an OFF state, a different one of each operation sensor associated with a different one of each of the heaters, for sensing electrical current through the associated heater, being in an ON state when electrical current through the associated heater is sensed, and being in an OFF state when electrical current through the associated heater is not sensed;

at least one comparator disposed within the cart, a different one of each of the comparators associated with a different one of each of the heaters;

for comparing the state of the controller associated with the heater against the state of the operation sensor associated with the heater;

for generating a high comparator signal associated with the heater when the state of the controller associated with the heater is on and the state of the operation sensor associated with the heater is on;

for generating a mid comparator signal associated with the heater when the state of the controller associated with the heater is off and the state of the operation sensor associated with the heater is off;

for generating a low comparator signal associated with the heater when the state of the controller associated with the heater is different from the state of the operation sensor associated with the heater; and at least one status indicator, a different one of each of the status indicators associated with a different one of each of the heaters, for providing a status output based on the comparator signal associated with the heater.

4. The rethermalization system of claim 3 wherein the status indicator further comprises an LED which flashes in response to the low comparator signal, is off in response to the mid comparator signal, and which is steadily lit in response to the high comparator signal.

* * * * *